United States Patent [19]

Kreamer

[11] Patent Number: 4,537,009
[45] Date of Patent: Aug. 27, 1985

[54] METHOD AND APPARATUS FOR PACKAGING ARTICLES SUCH AS FRUIT

[75] Inventor: William C. Kreamer, San Jose, Calif.

[73] Assignee: FMC Corporation, Chicago, Ill.

[21] Appl. No.: 418,118

[22] Filed: Sep. 14, 1982

[51] Int. Cl.³ .......................................... B65B 47/04
[52] U.S. Cl. ...................................... 53/441; 53/453; 53/556; 53/559; 53/560
[58] Field of Search ............... 53/556, 559, 560, 557, 53/555, 373, 441, 442, 453, 454, 427

[56] References Cited

U.S. PATENT DOCUMENTS

| | | | |
|---|---|---|---|
| 2,141,318 | 12/1938 | Salfisberg | 18/56 |
| 2,297,041 | 5/1952 | Stokes | 53/555 X |
| 2,438,089 | 3/1948 | Carson | 18/56 |
| 2,486,759 | 11/1949 | Pfeiffer | 18/19 |
| 2,490,781 | 12/1949 | Cloud | 53/556 X |
| 2,494,484 | 1/1950 | Nicolle | 18/19 |
| 2,547,835 | 4/1951 | Pfeiffer | 53/441 X |
| 2,902,808 | 9/1959 | Lang | 53/560 |
| 3,333,395 | 8/1967 | Doucette et al. | 53/555 |
| 3,370,957 | 2/1968 | Wagner et al. | 99/90 |
| 3,381,444 | 5/1968 | Vaughan | 53/33 |
| 3,597,899 | 8/1971 | Hanson | 53/556 |
| 3,665,673 | 5/1972 | Billett et al. | 53/30 |
| 3,686,820 | 8/1972 | Zenger et al. | 53/559 X |
| 3,686,822 | 8/1972 | Wolfelsperger . | |
| 3,772,850 | 11/1973 | Fujiwara | 53/555 |
| 3,851,440 | 12/1974 | Horsky . | |
| 3,884,016 | 5/1975 | Bostrom . | |
| 3,890,761 | 6/1975 | Ramsey | 53/427 |
| 3,933,569 | 1/1976 | Grasvoll | 156/515 |
| 4,008,351 | 2/1977 | Inoue et al. | 428/411 |
| 4,058,953 | 11/1977 | Sanborn, Jr. et al. | 53/453 X |

FOREIGN PATENT DOCUMENTS 938777 2/1956 Fed. Rep. of Germany ........ 53/555

*Primary Examiner*—Horace M. Culver
*Attorney, Agent, or Firm*—A. J. Moore; H. M. Stanley; R. B. Megley

[57] ABSTRACT

A method and apparatus is disclosed for packaging articles in two portions of film which are fed between outer and inner annular film clamping mechanisms with the outer clamping mechanism firmly clamping the film portions while stretching the film over the article. The inner annular clamping mechanism then clamps the periphery of the film portions together immediately inward of the seal area, and the outer clamps release the film allowing an annular hot knife to seal and sever the film portions in a relaxed area. A low inertia film drive system is also provided with the film supply rolls on one side of the clamping mechanisms being continuously driven while brush rolls on the other side of the clamping mechanisms are intermittently driven. The low inertia film drive system also includes components for assuring that the film is stressed longitudinally and transversely to remove wrinkles therefrom, and to assure that the film portions are sealed and severed in a completely relaxed area.

19 Claims, 34 Drawing Figures

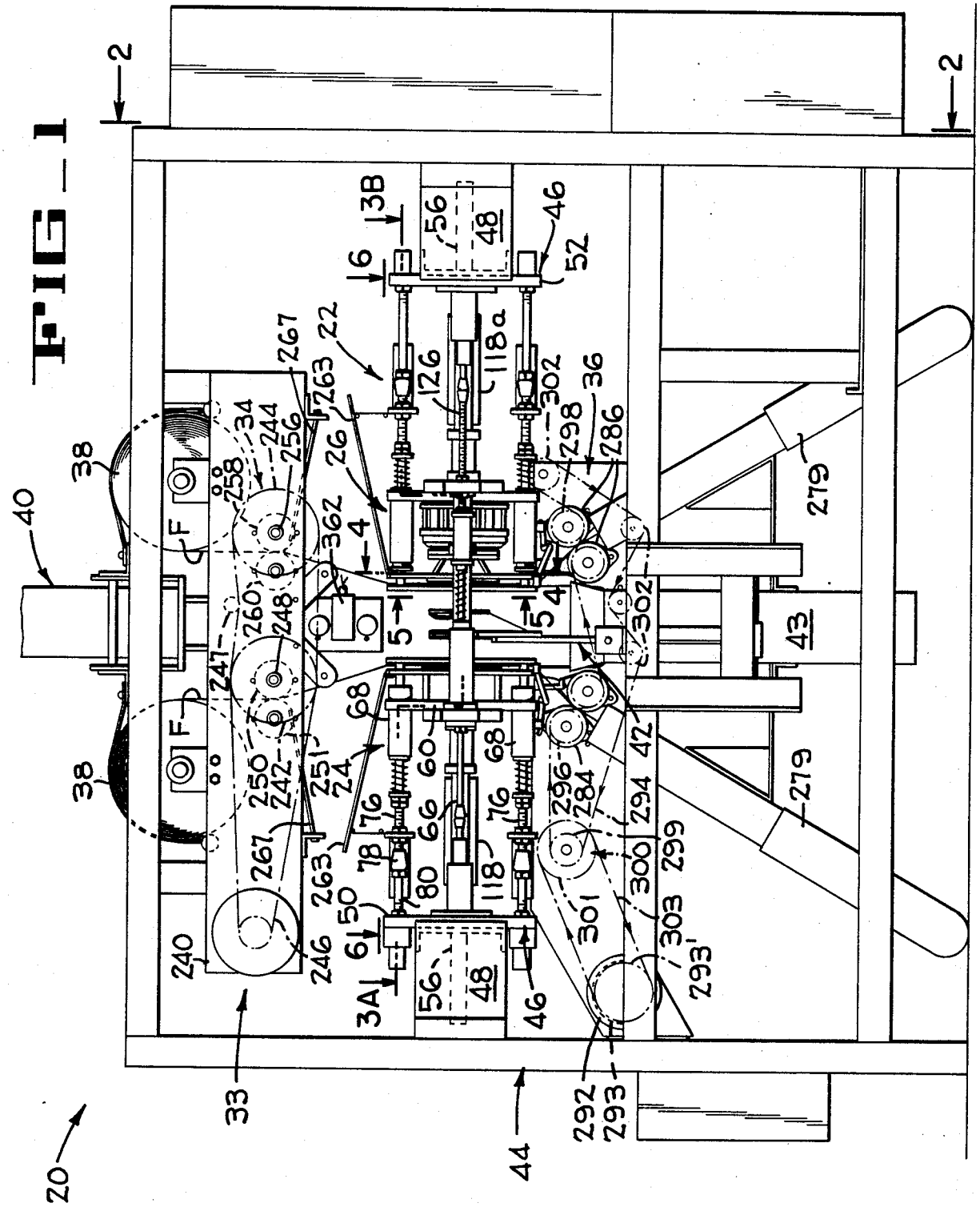

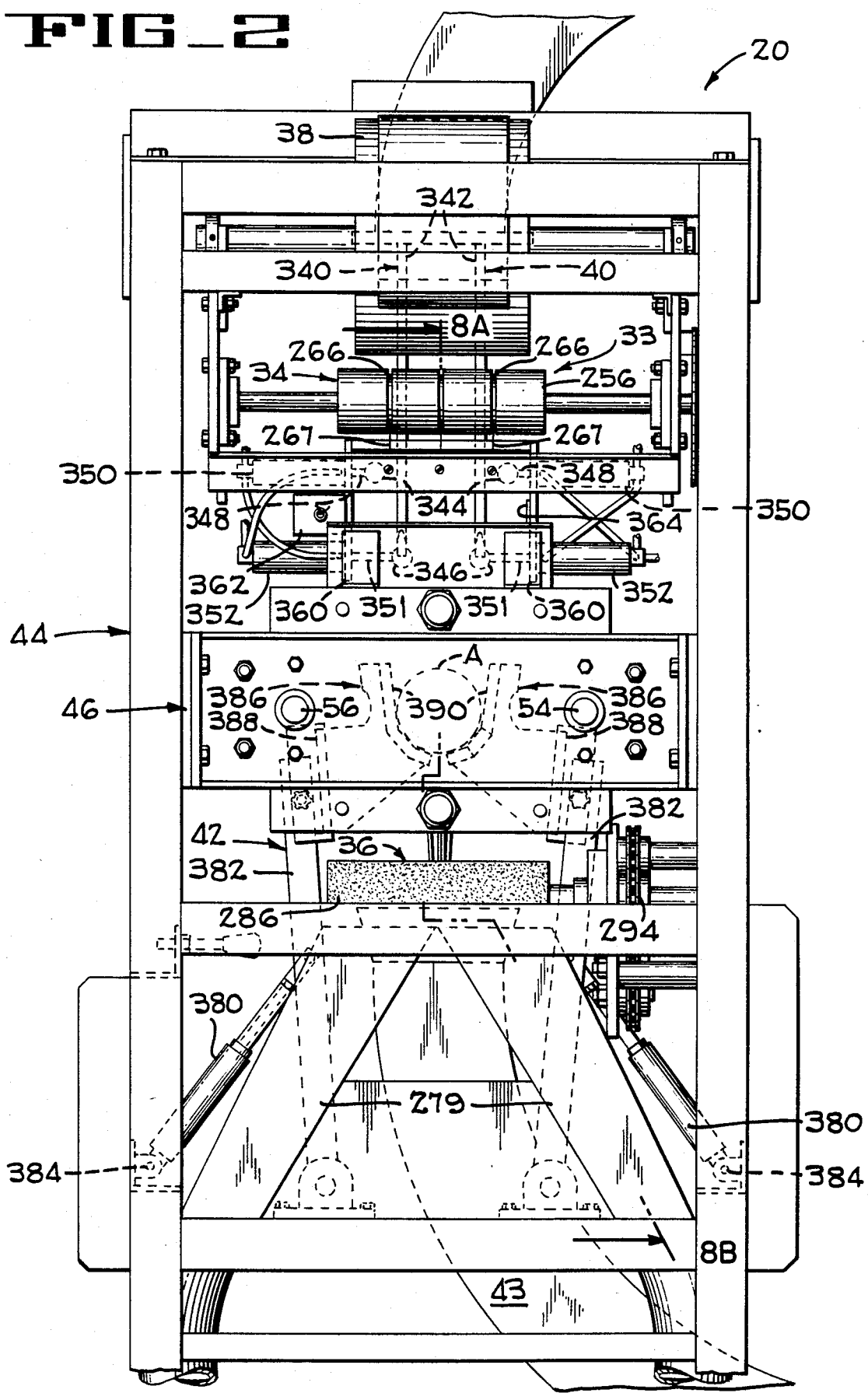
FIG_2

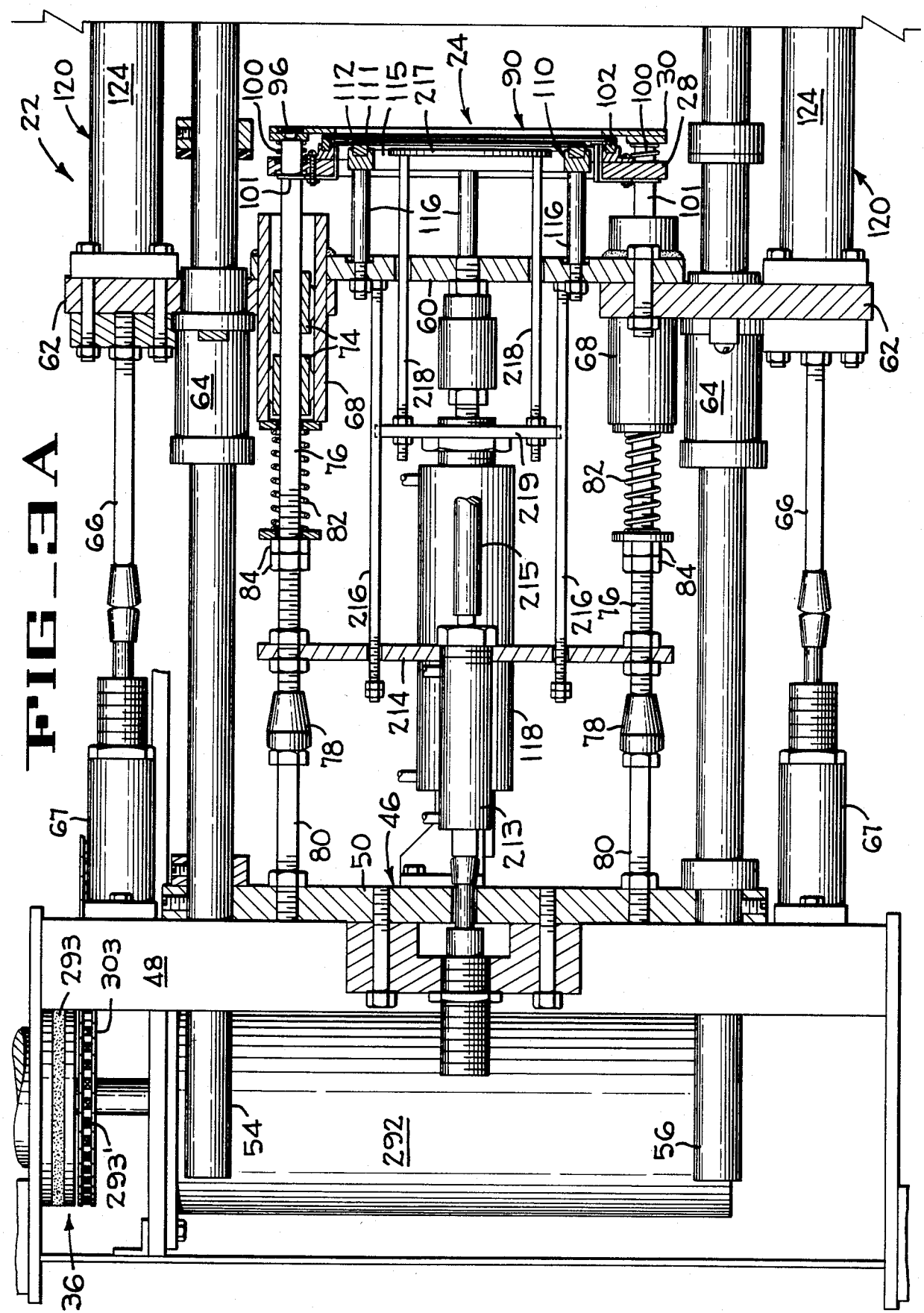

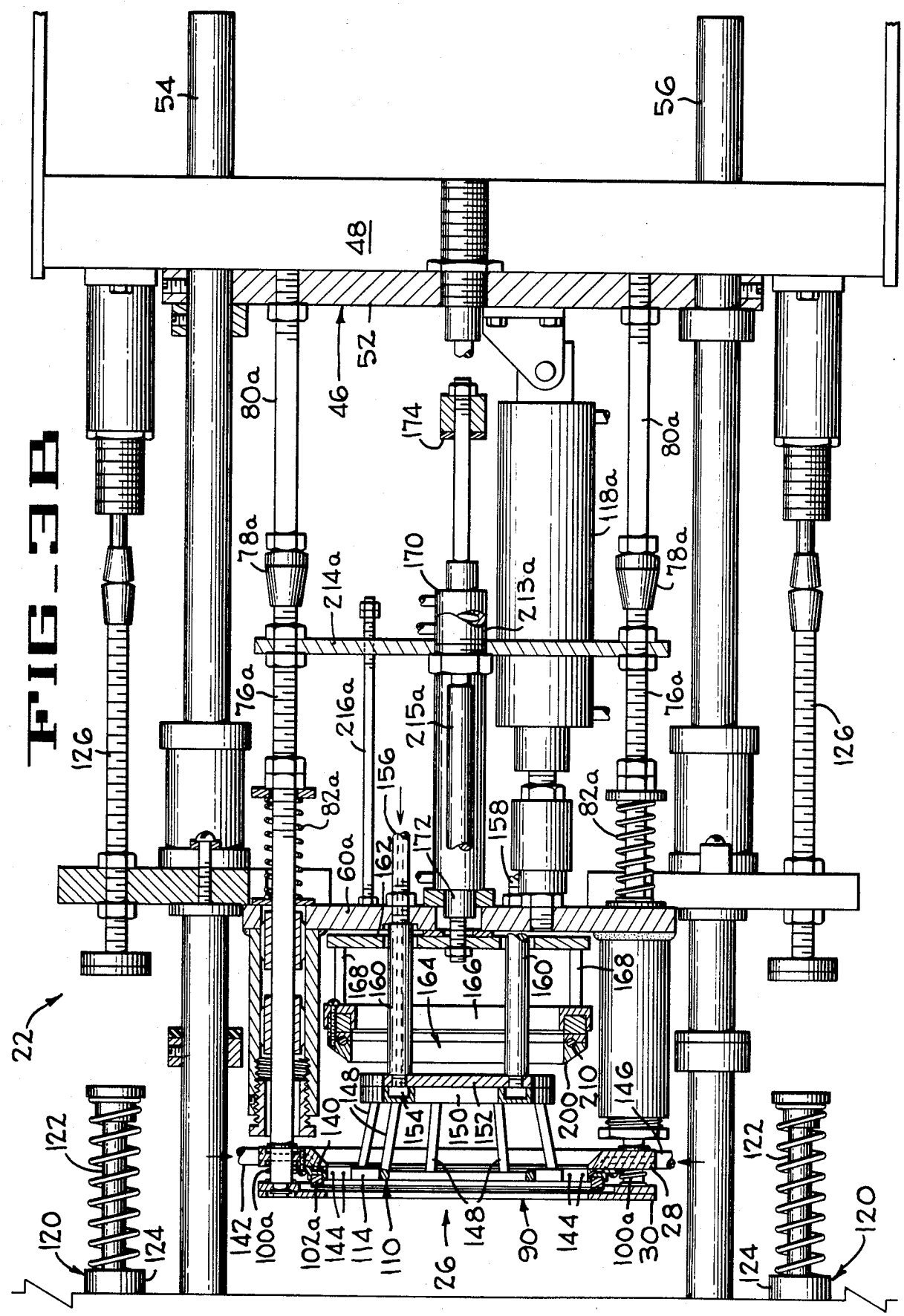

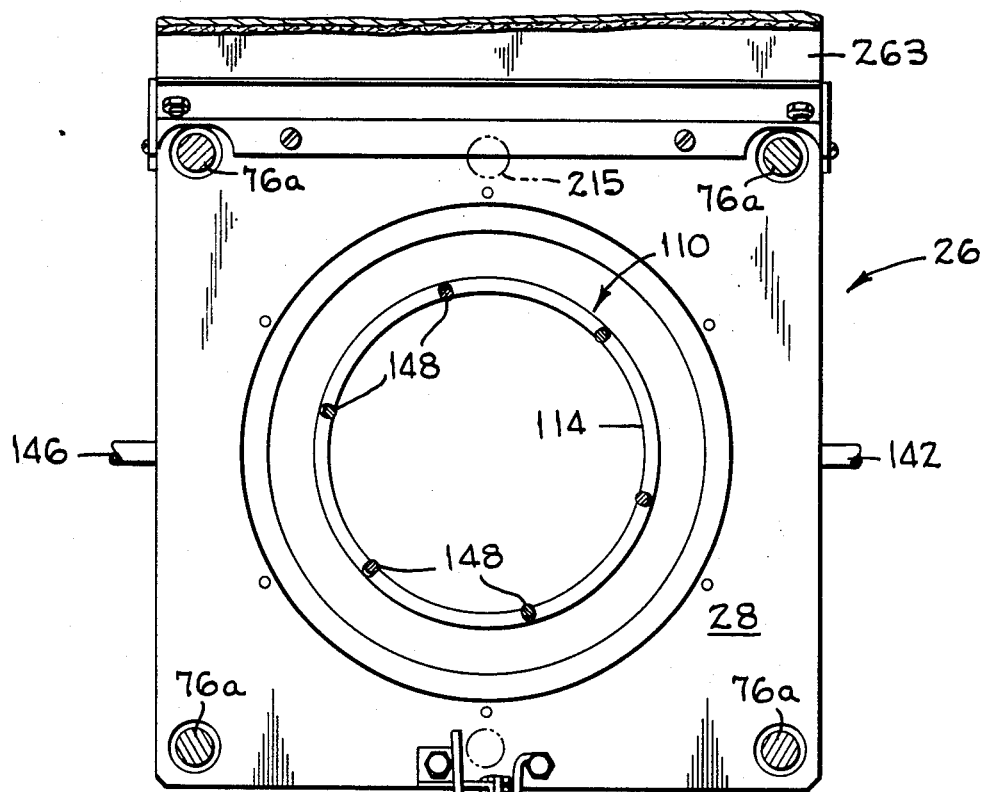
FIG_4
FIG_5
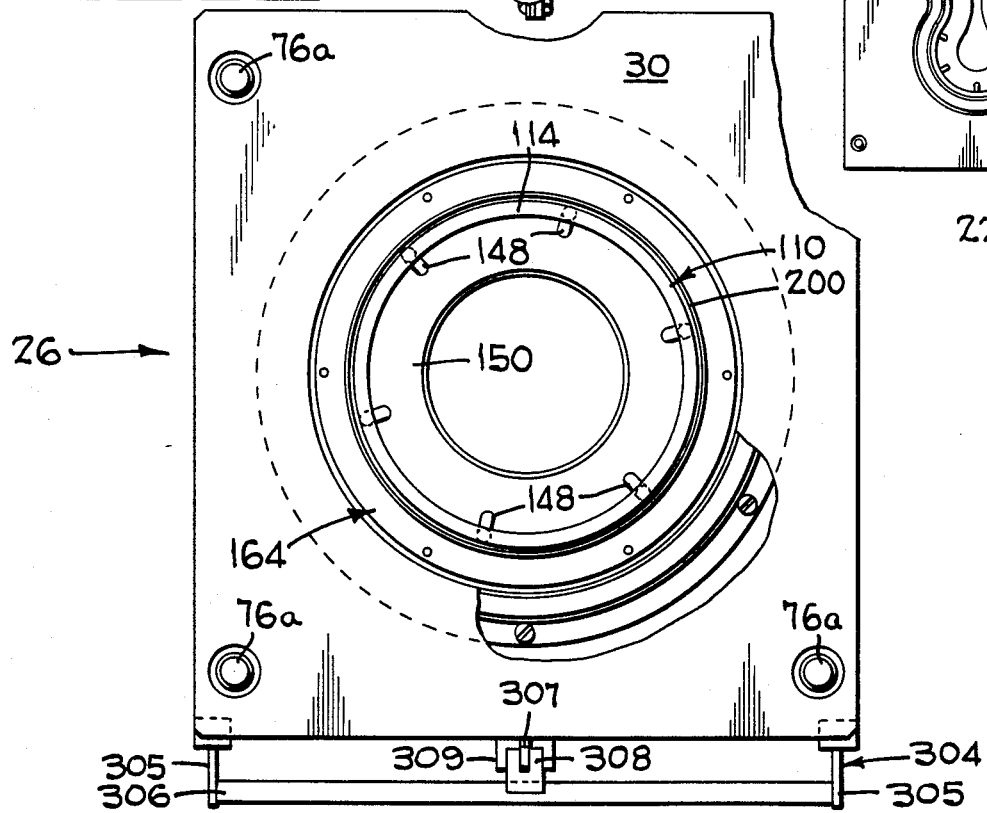
FIG_5A

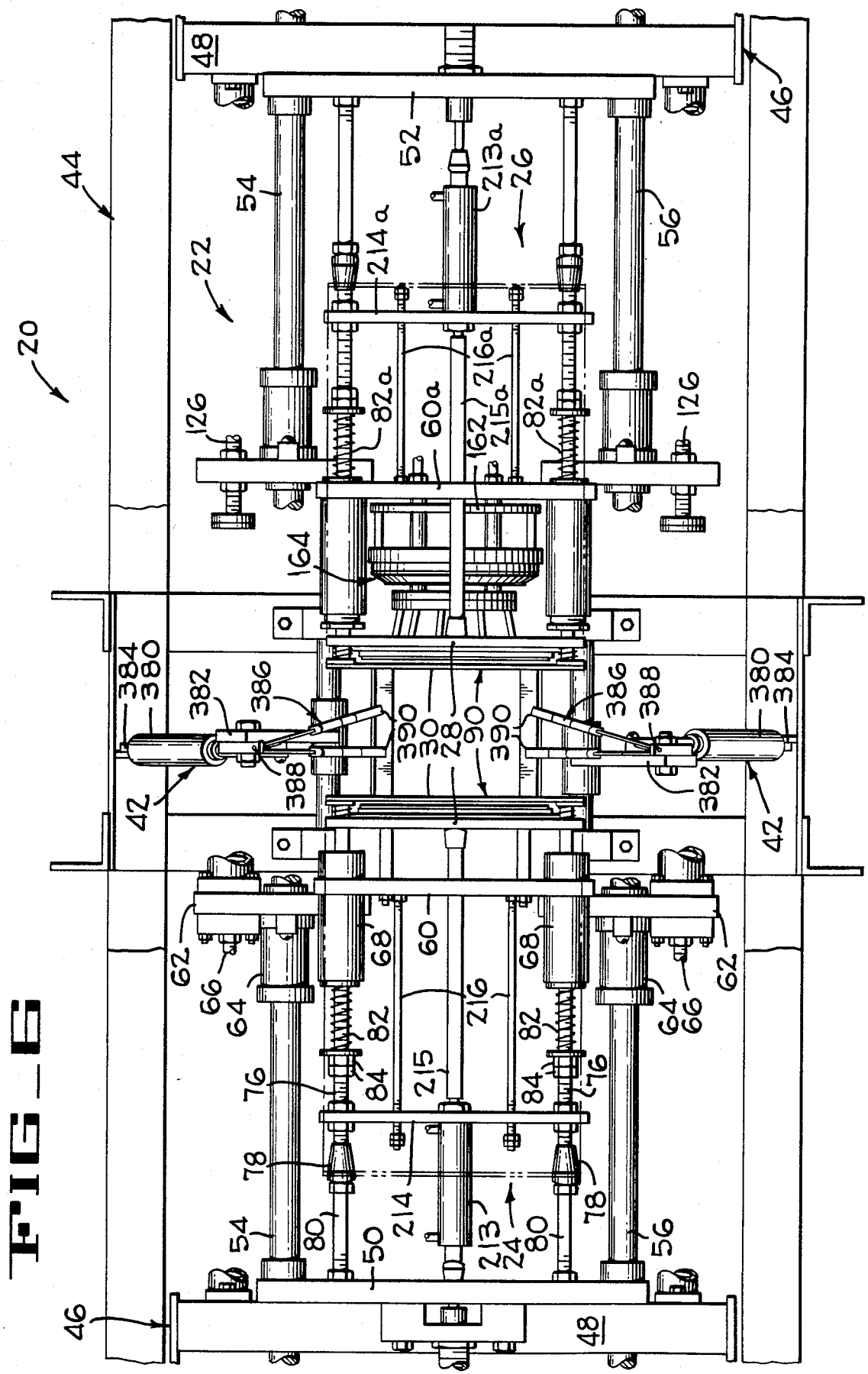

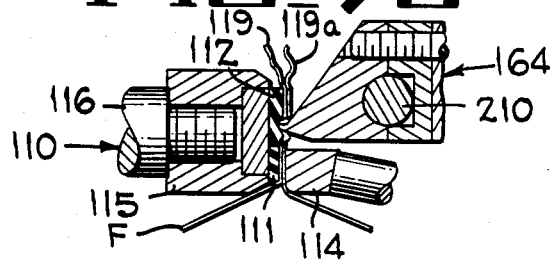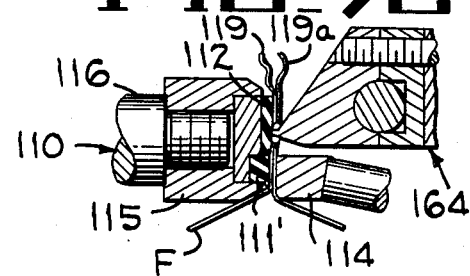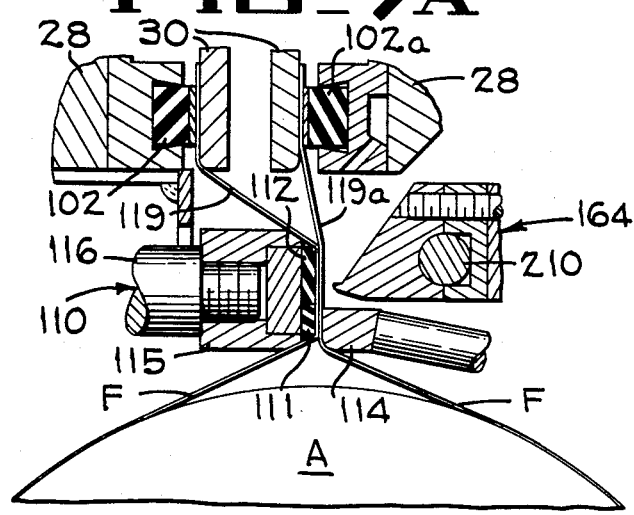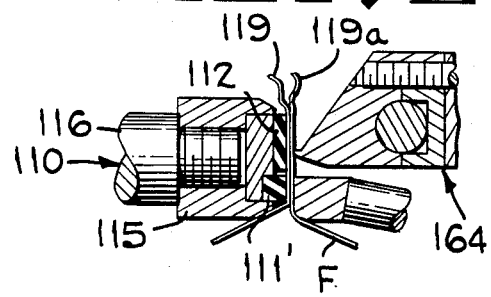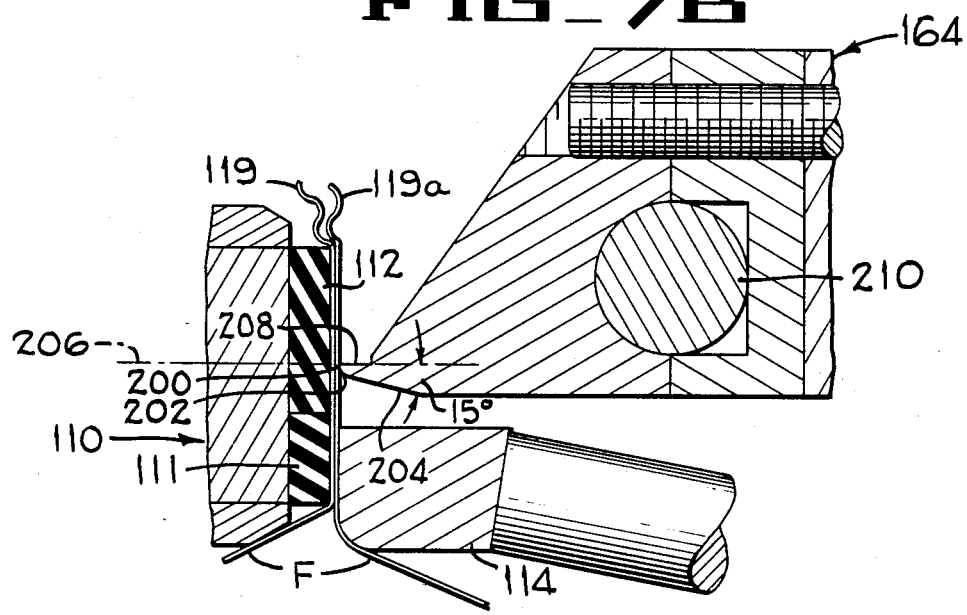

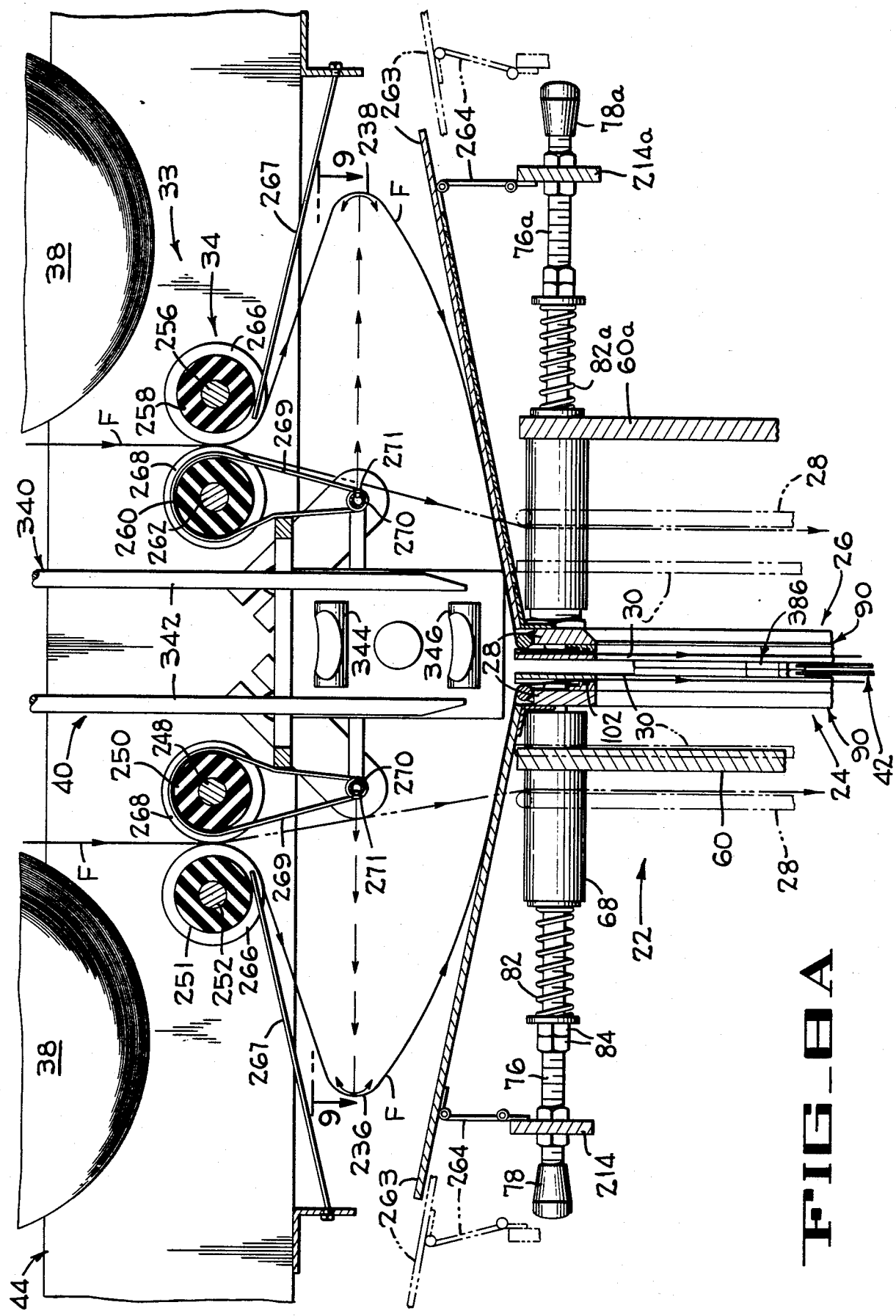

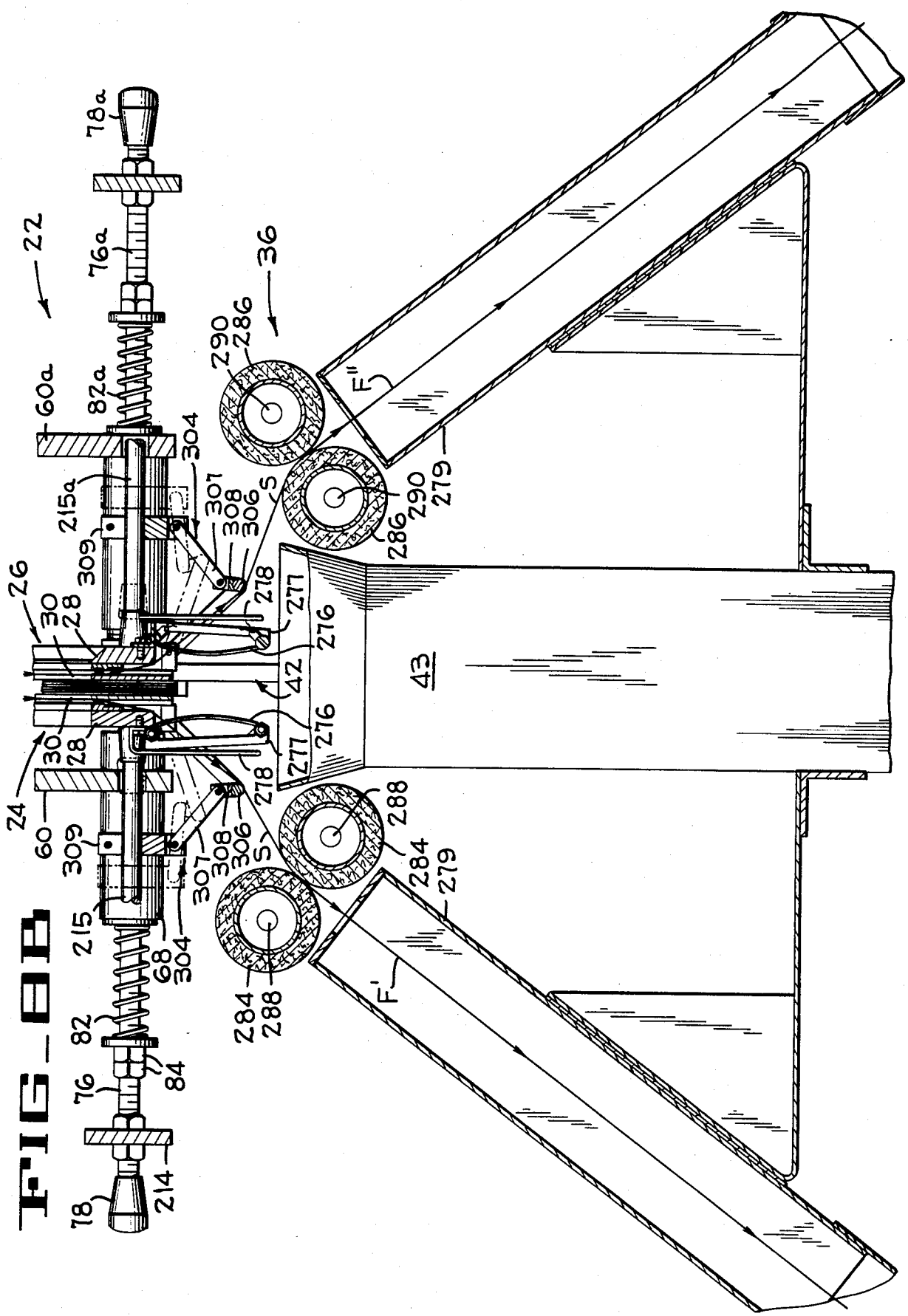

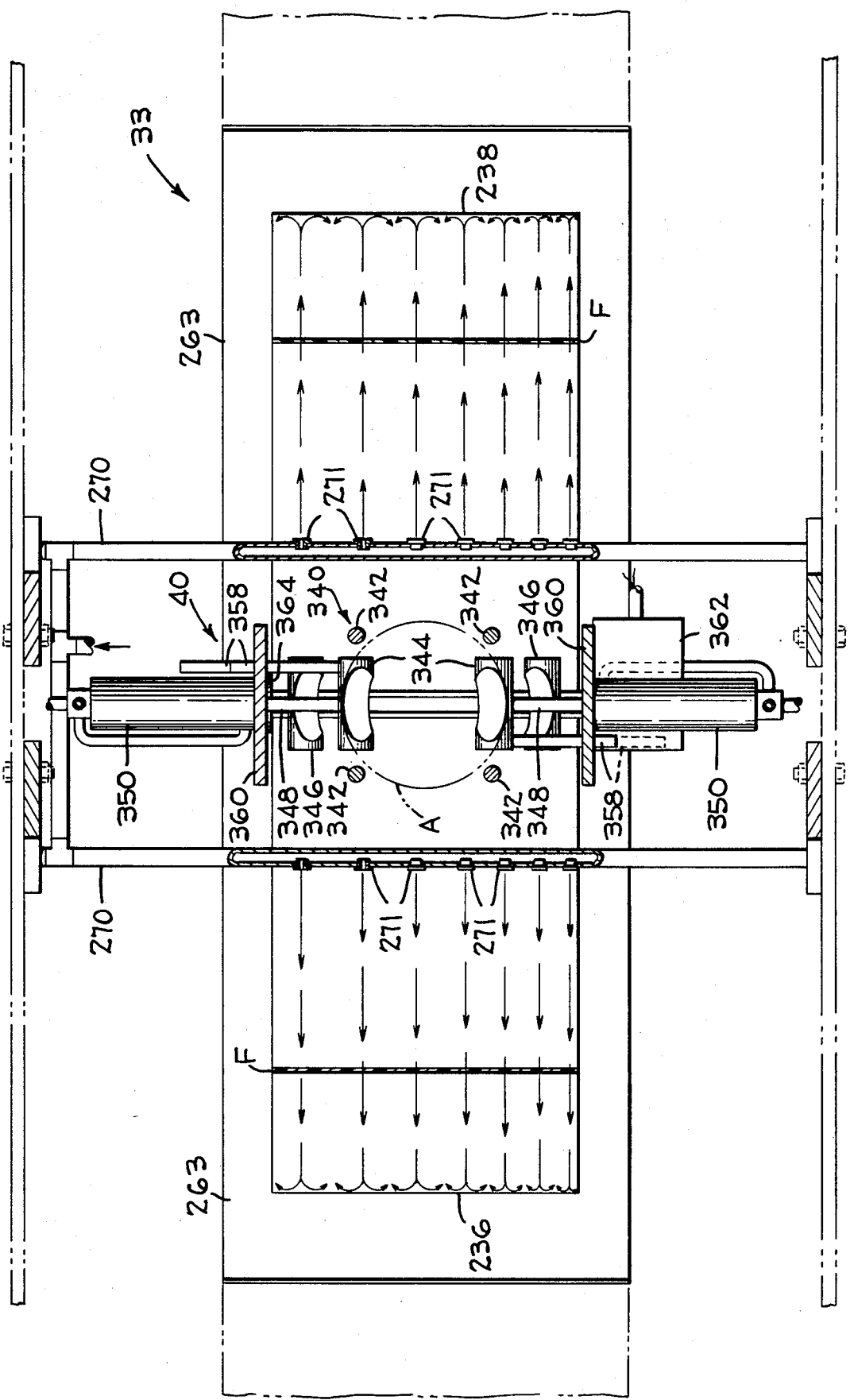

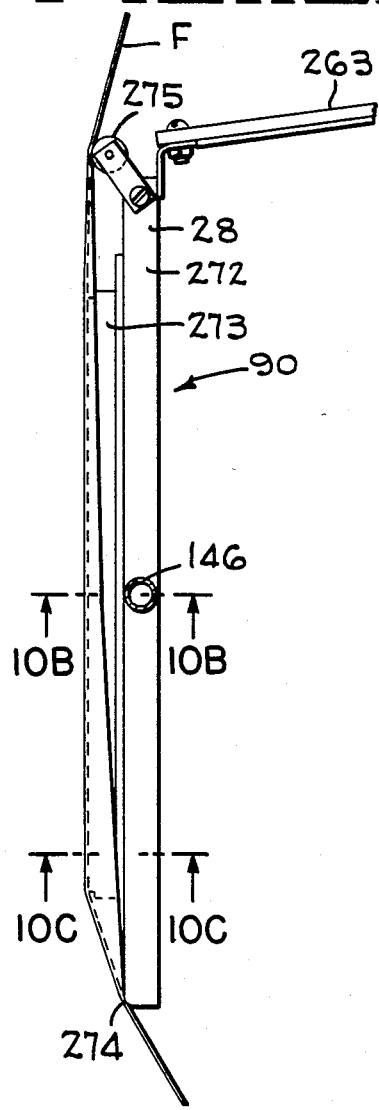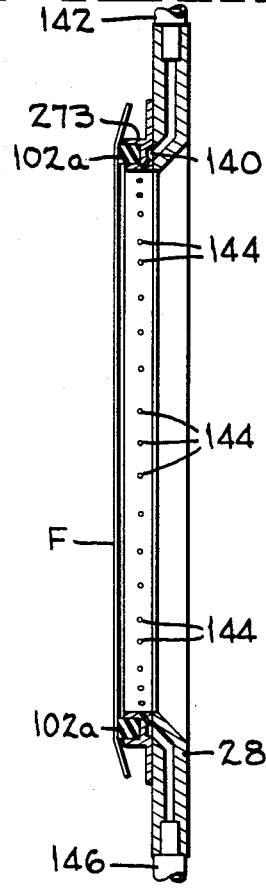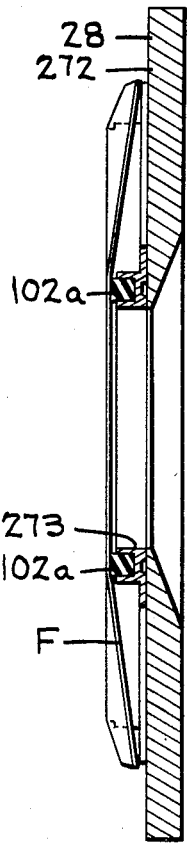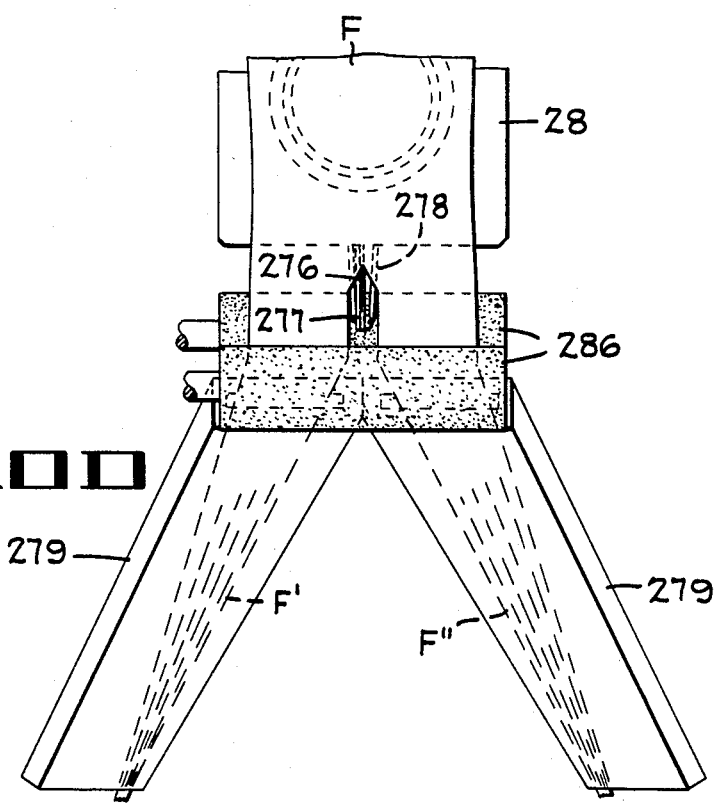

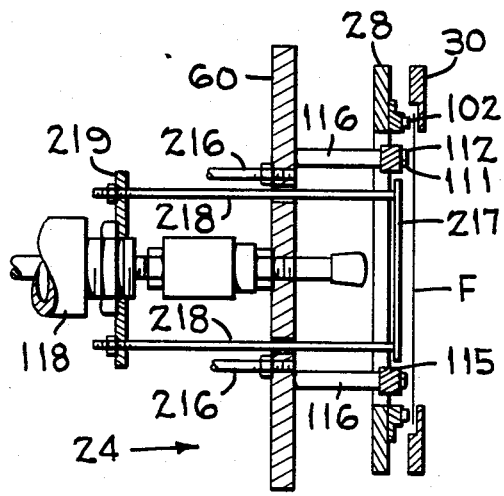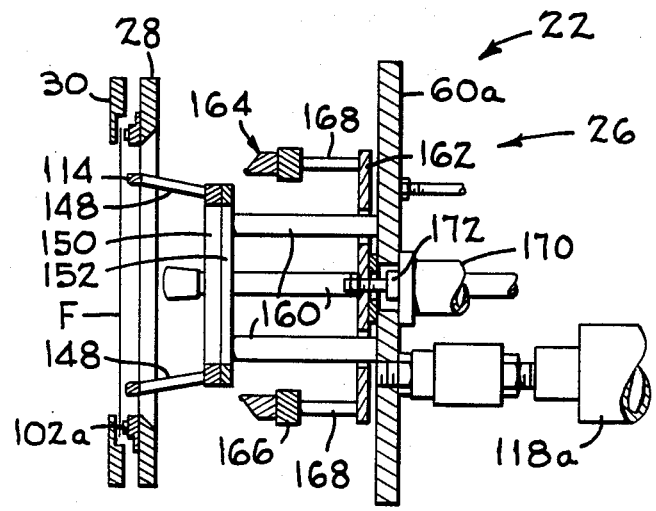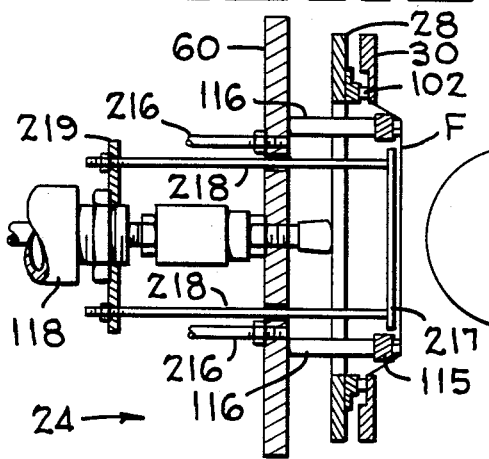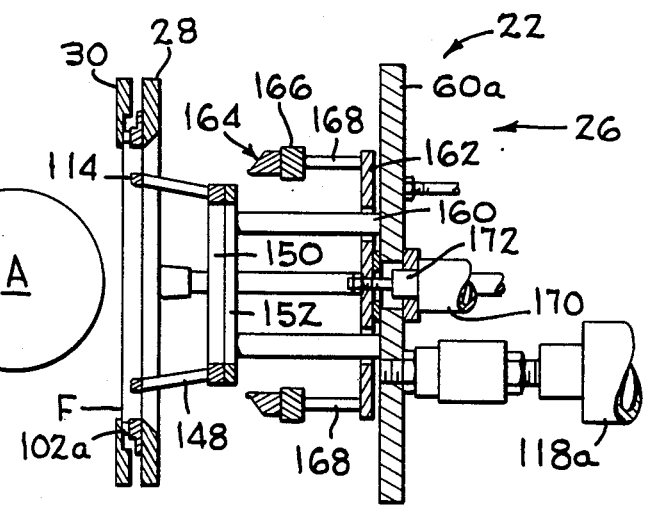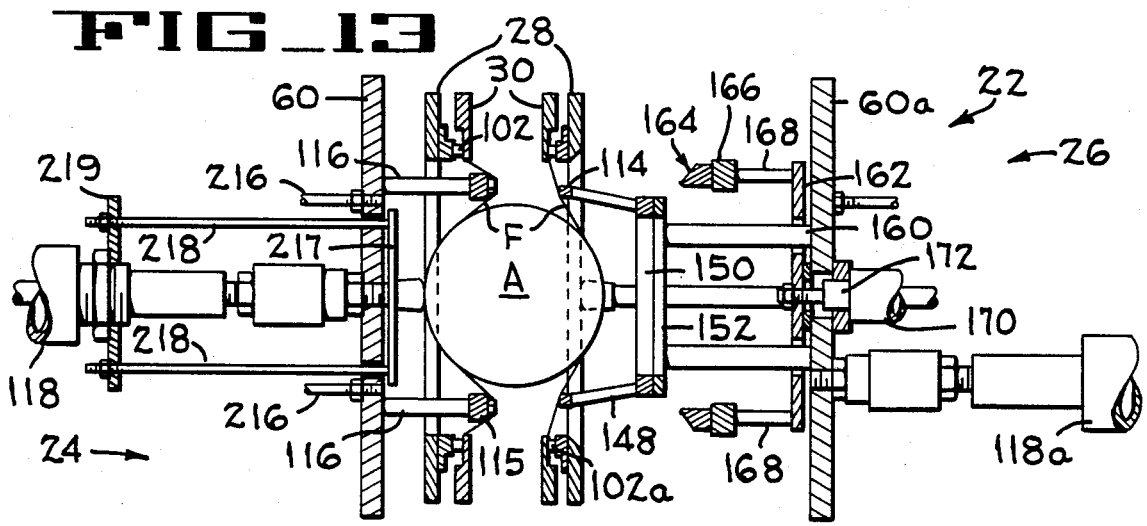

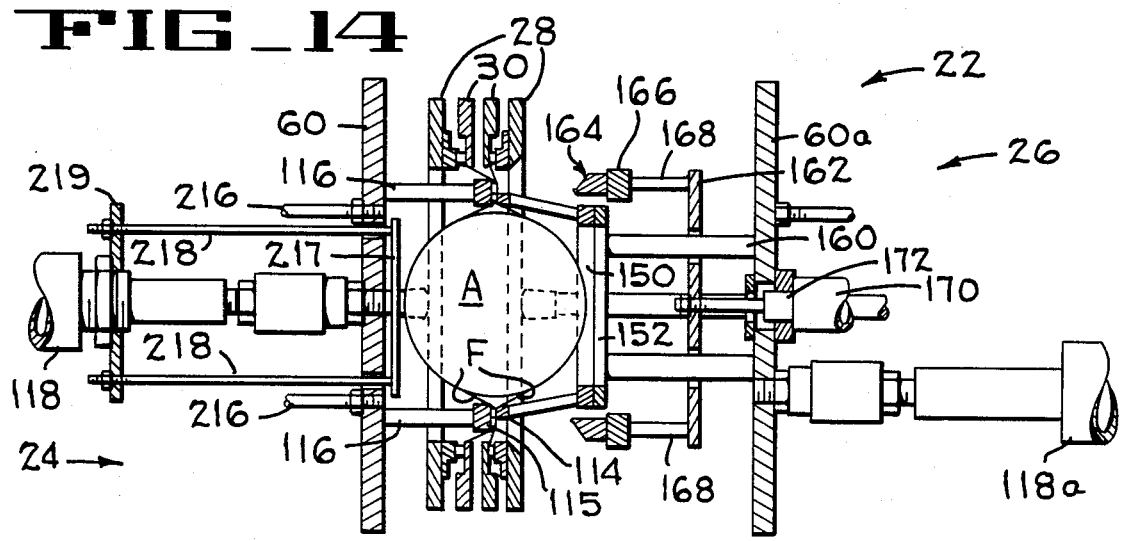
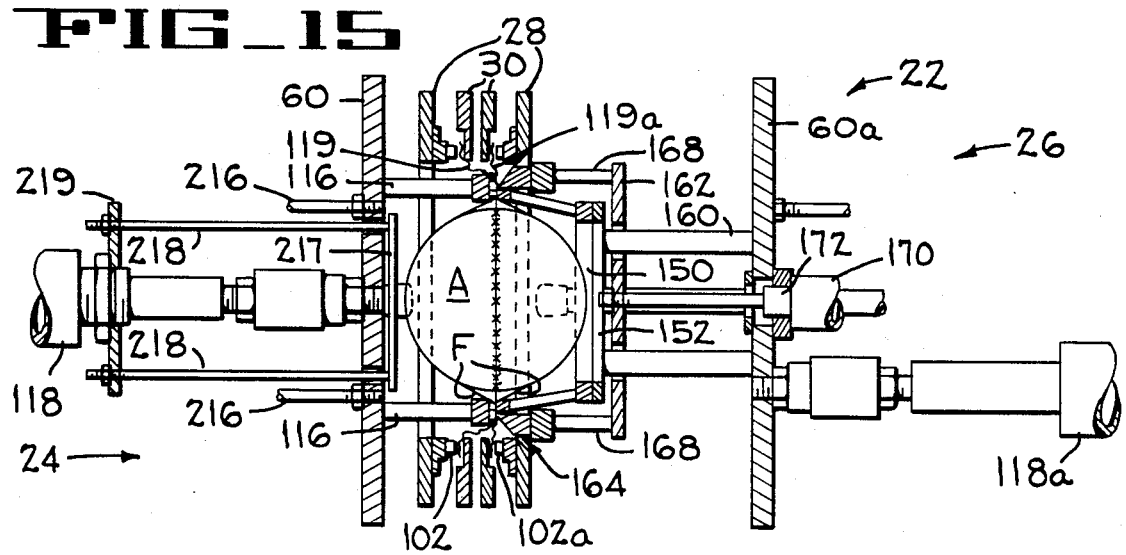
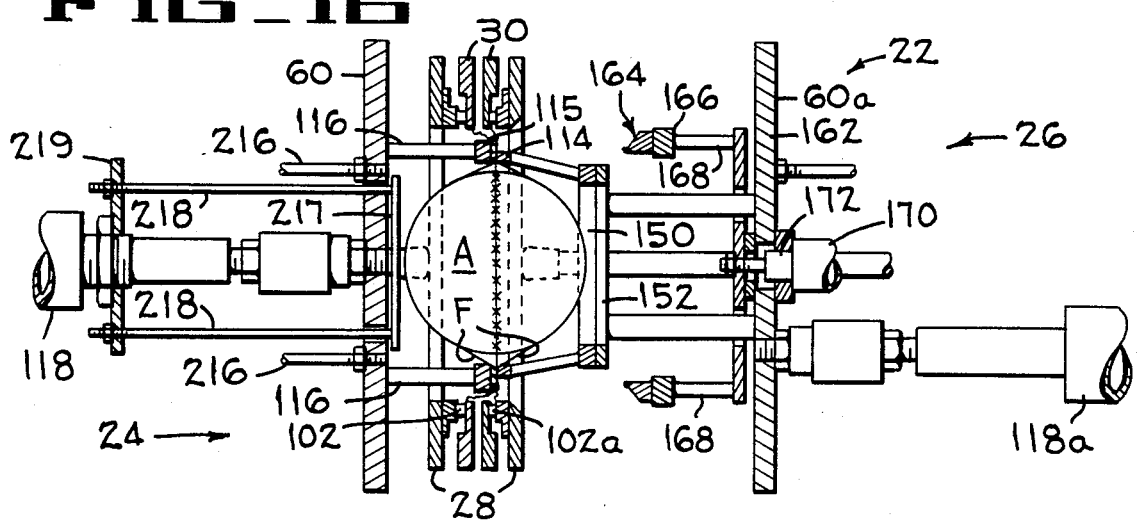

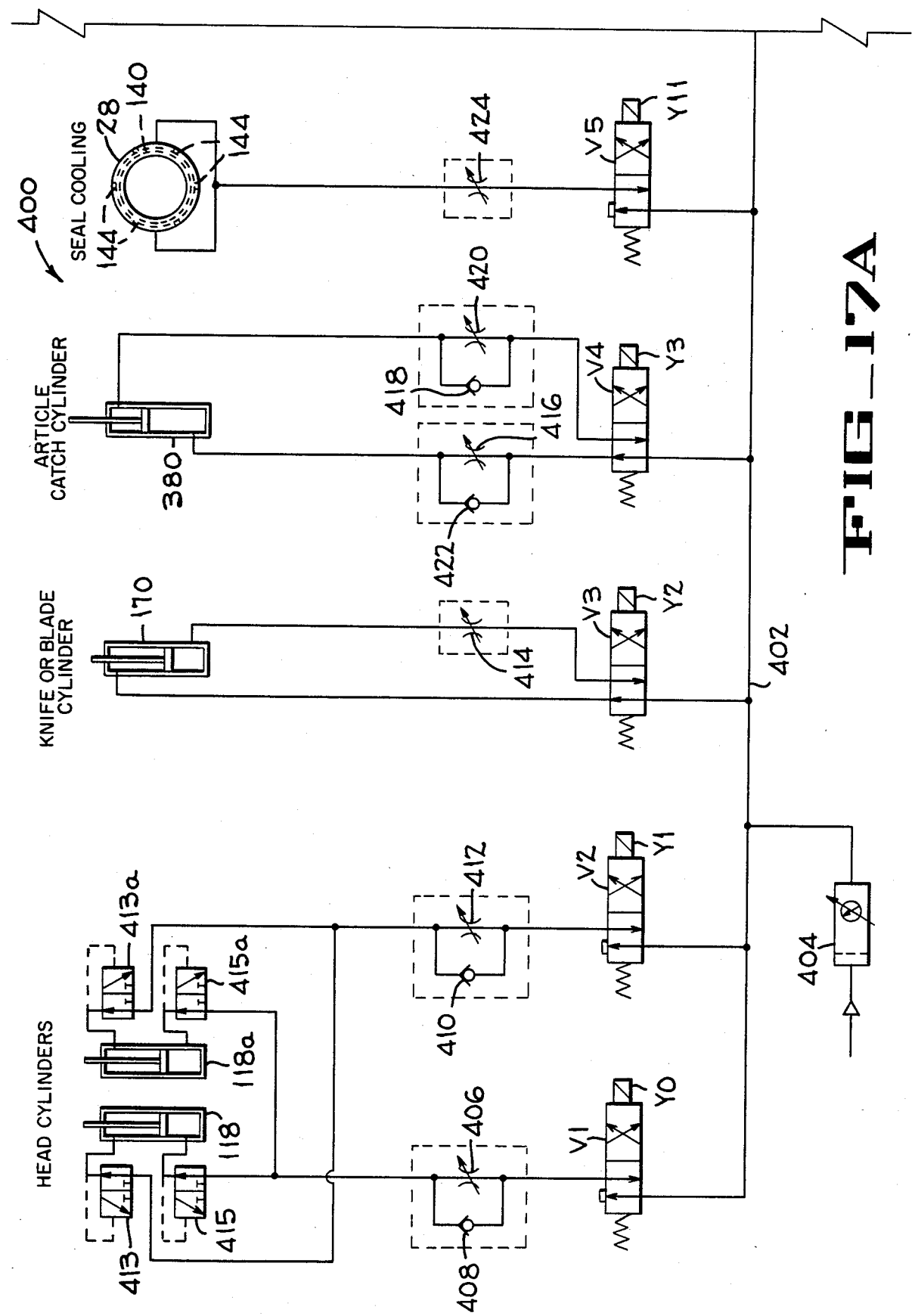
FIG_17A

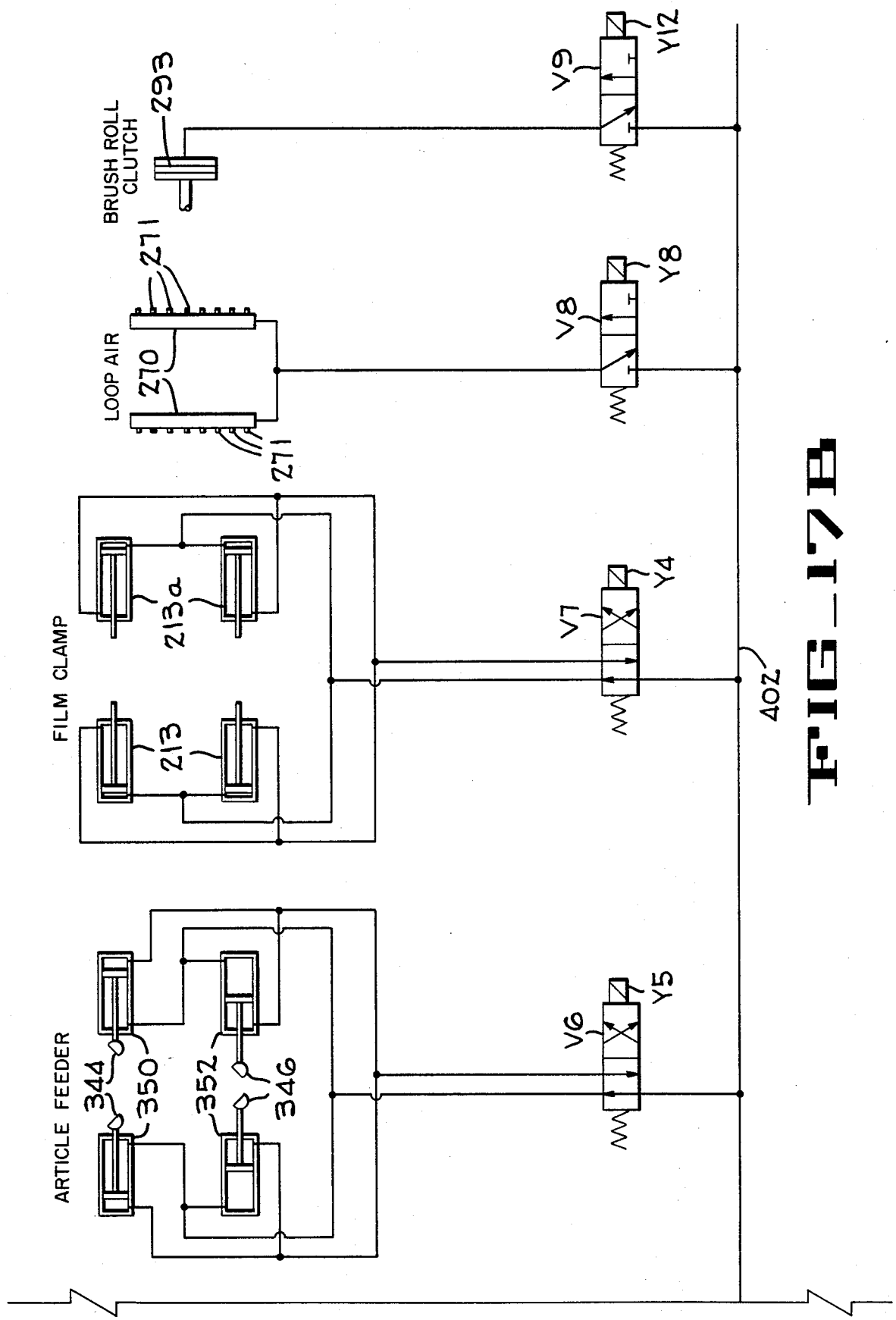
FIG_17B

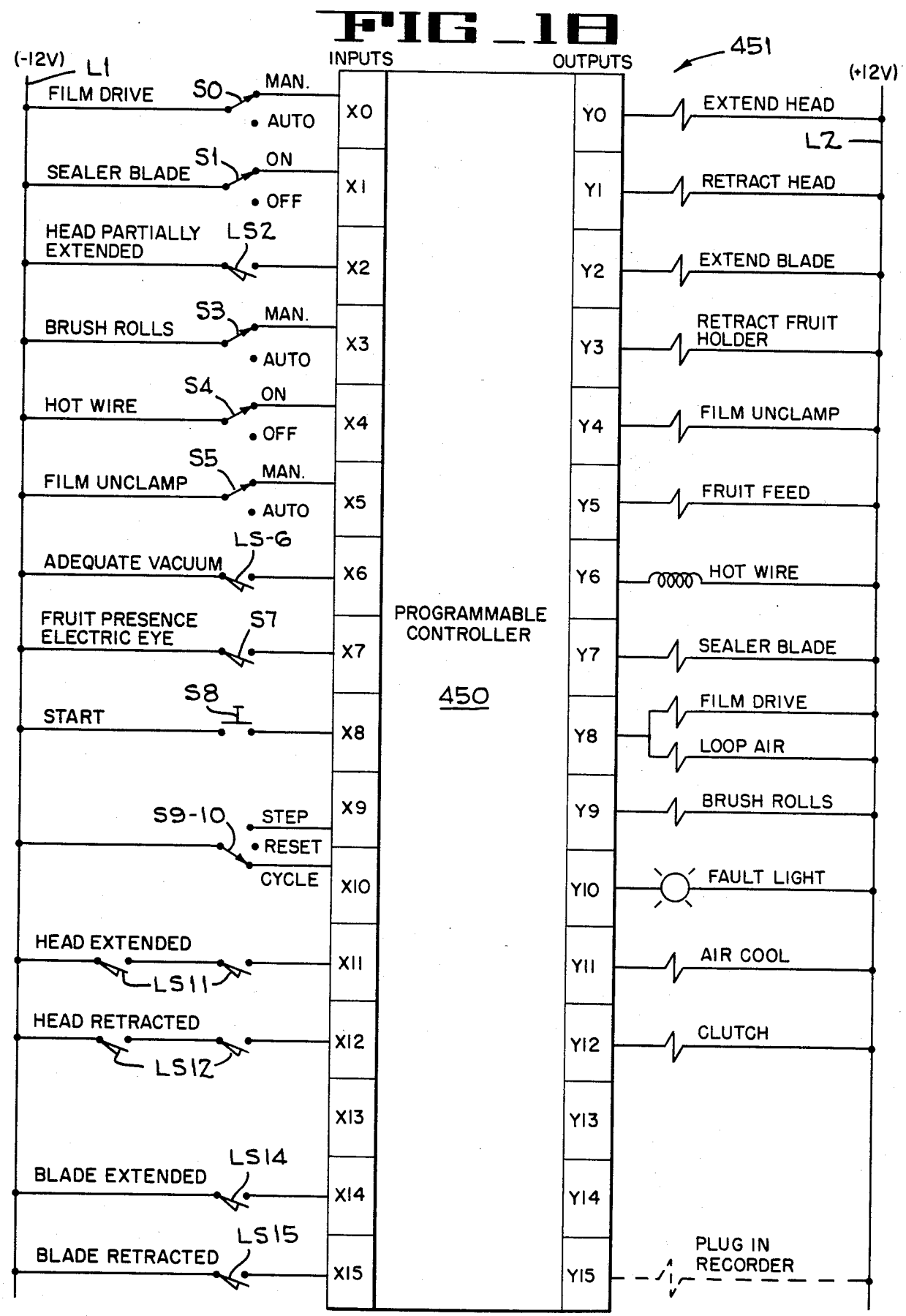

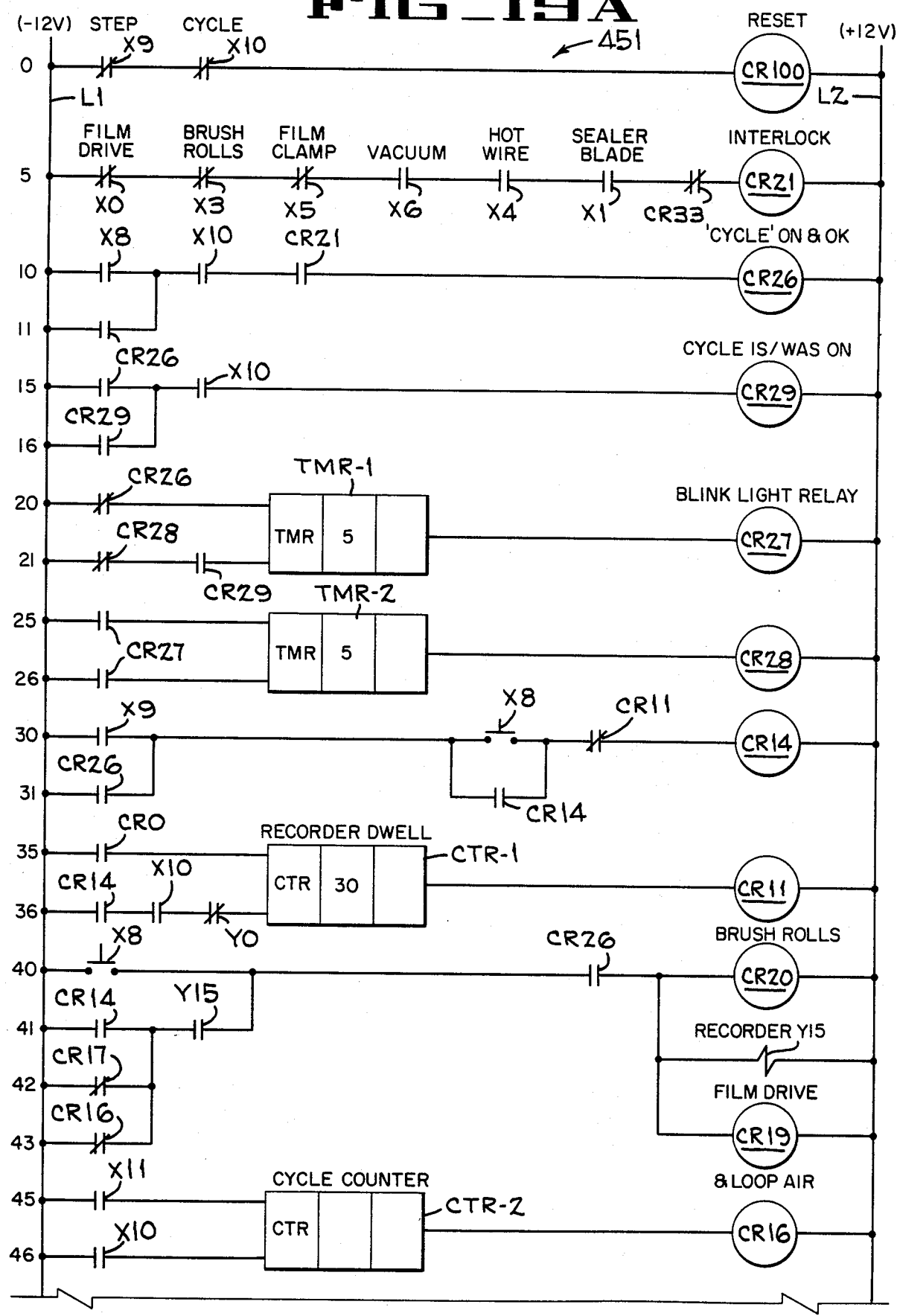

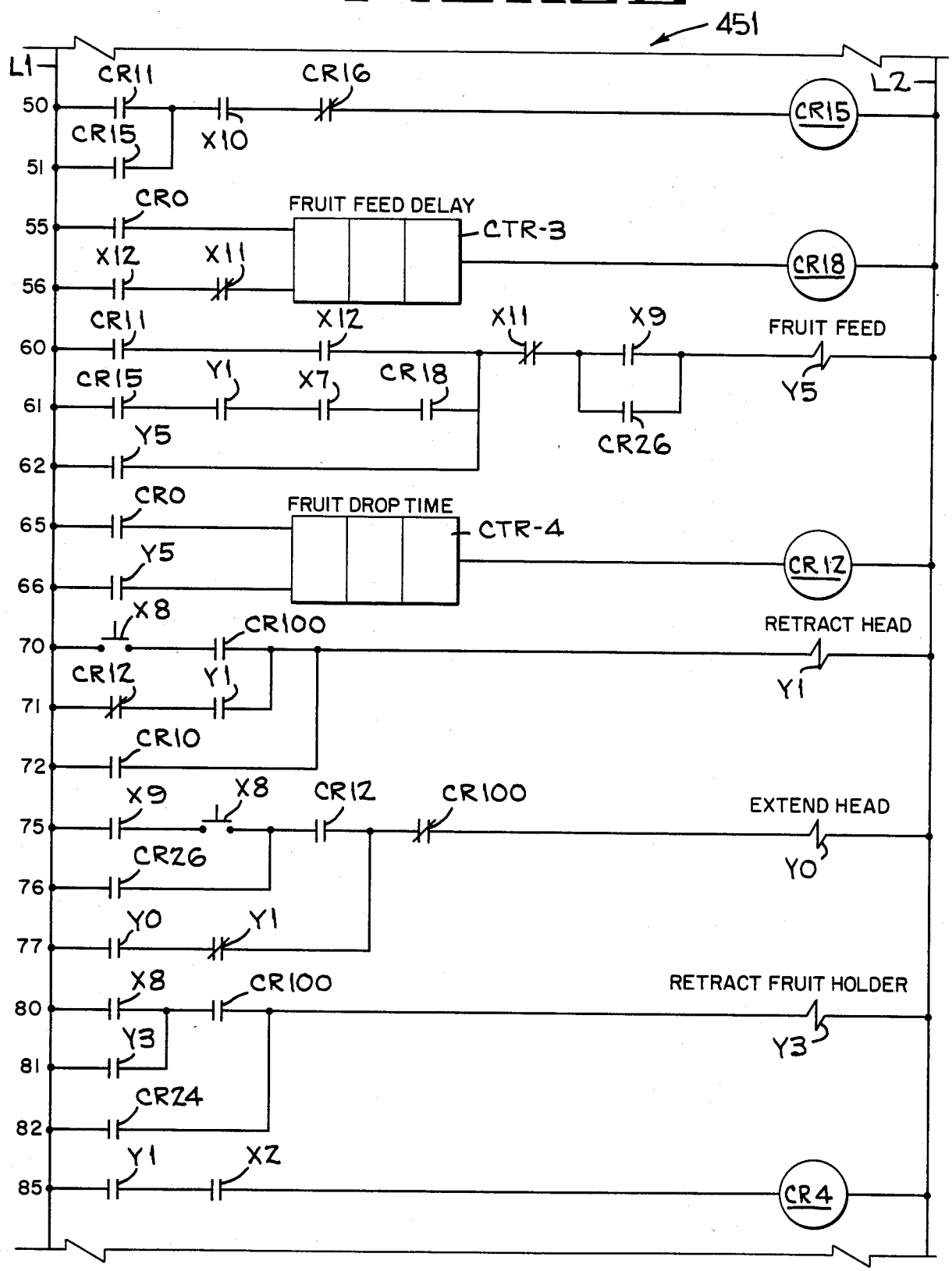

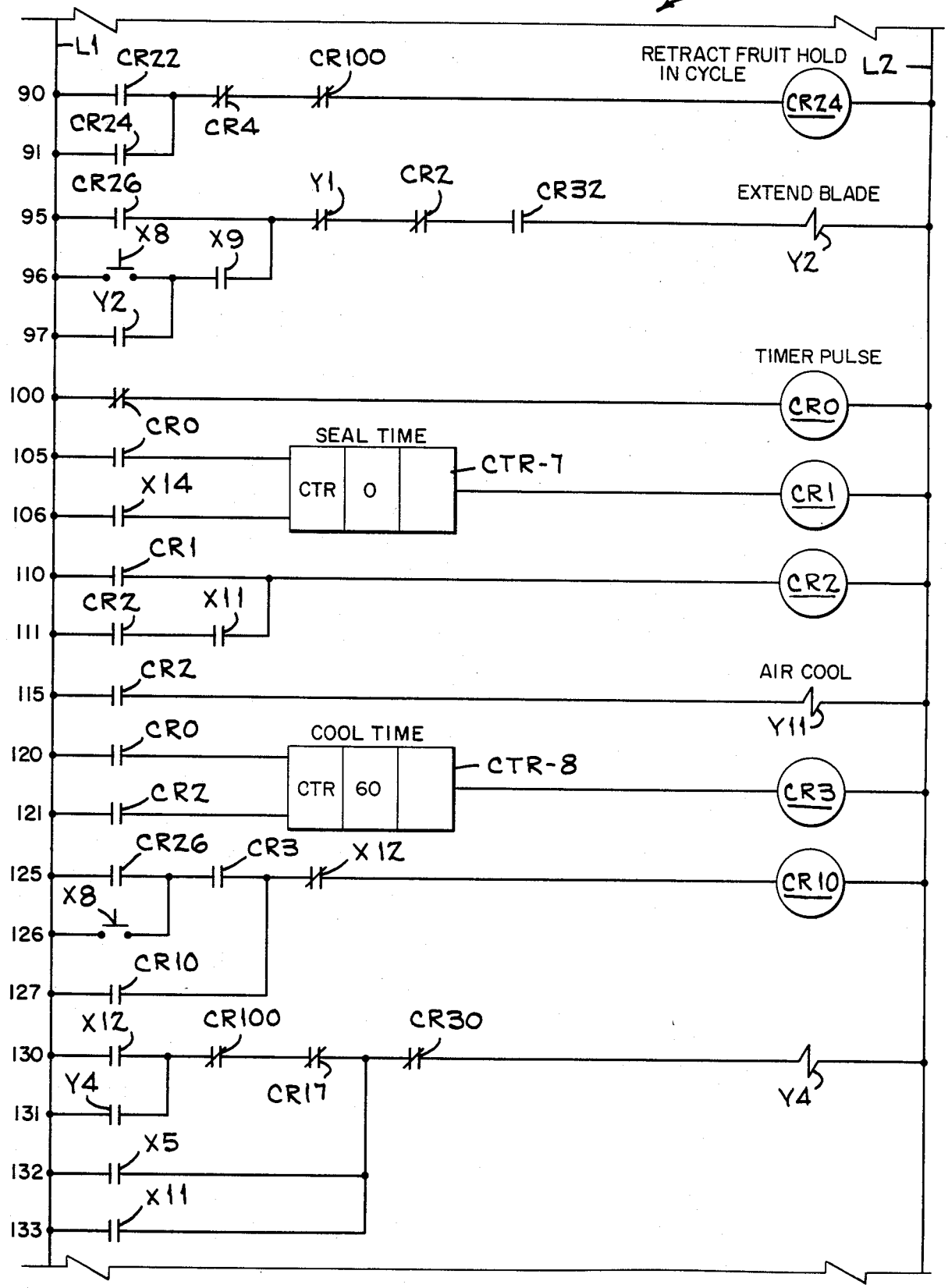

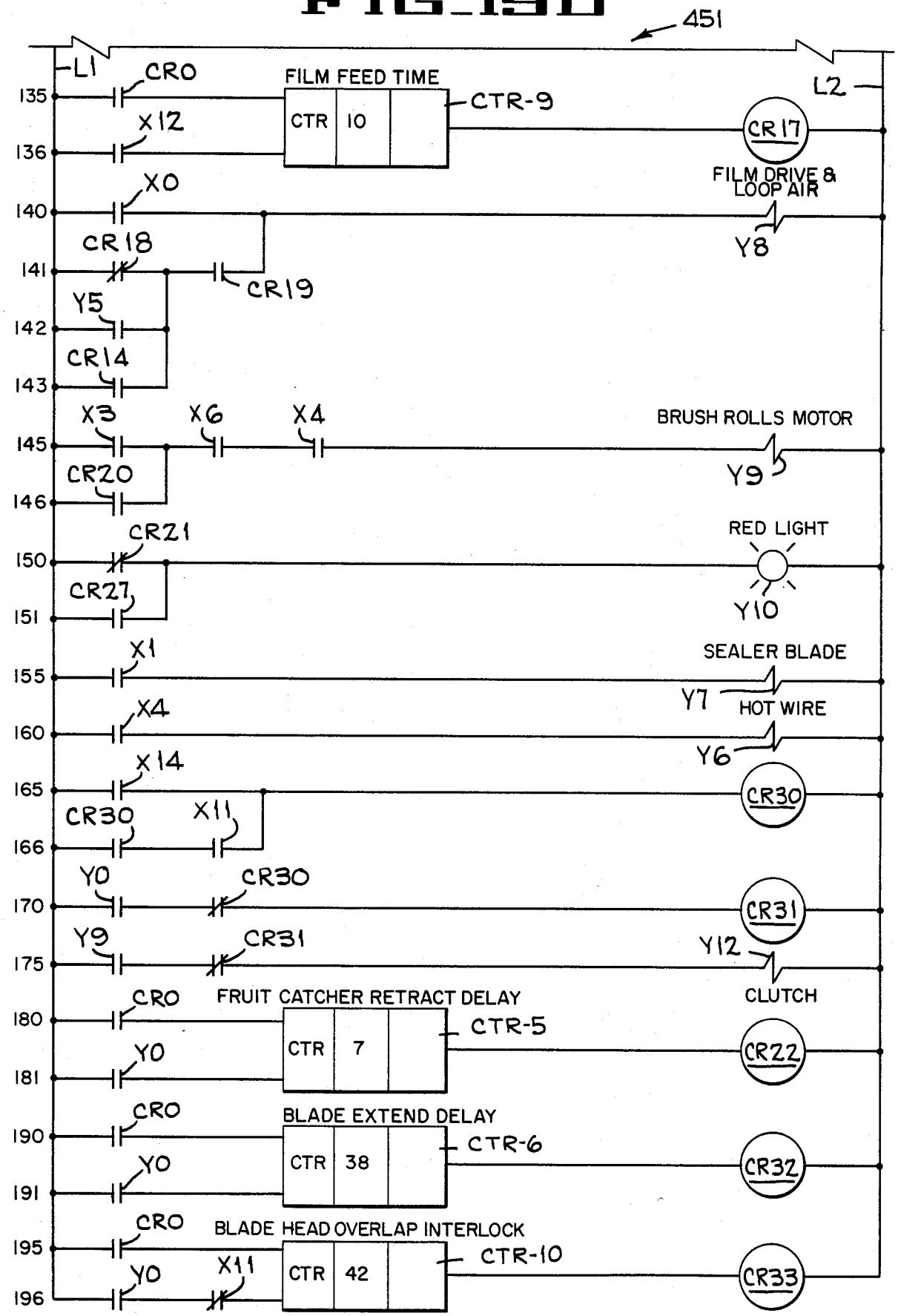
FIG_19D

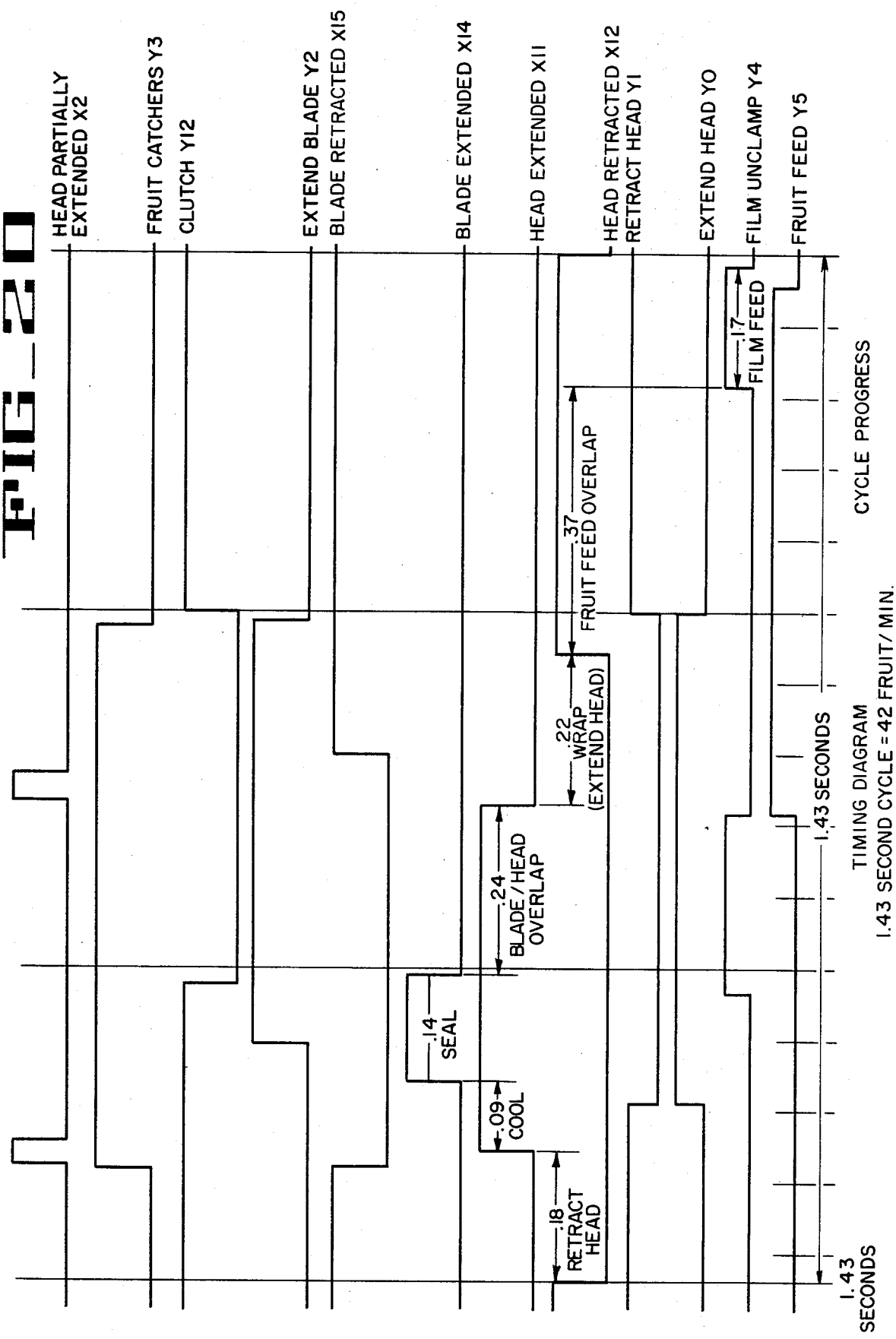

METHOD AND APPARATUS FOR PACKAGING ARTICLES SUCH AS FRUIT

CROSS REFERENCE TO RELATED APPLICATION

The present invention is similar to Viitanen et al application Ser. No. 418,126 entitled Method And Apparatus For Packaging Articles Such As Fruit and filed on even date herewith.

BACKGROUND OF THE INVENTION

1. Field of the Invention

The present invention relates to a method and apparatus for packaging an article in a stretchable container. More particularly, the invention relates to a method and apparatus for packaging perishable living articles such as fresh fruit or vegetables in a stretchable wrapper for reducing moisture migration from the article while permitting gases such as oxygen and carbon dioxide to diffuse into and out of the package.

2. Description of the Prior Art

Packaging or wrapping an article between strips of stretchable wrapping material and thereafter heat sealing the strips together enabling the film to stretch tightly over the articles is broadly known in the art. U.S. patents such as Salfisberg U.S. Pat. No. 2,141,318; Vaughan U.S. Pat. No. 3,381,444 and Grasvoll U.S. Pat. No. 3,933,569 are representative of such systems.

It is broadly old to shrink wrap articles within plastic films which are heated, either before or after heat sealing, to soften the film causing the film to shrink and tightly conform to the shape of the article. U.S. patents such as Pfeiffer U.S. Pat. No. 2,486,759; Nicolle U.S. Pat. No. 2,494,484 and Horsky U.S. Pat. No. 3,851,440 are representative of this type of packaging.

It is recognized that fruit and vegetables or the like are living articles which live, after being severed from the plant, since they maintain life on the sugars and the like stored in the article itself. The metabolic activity of the article at this time is known as catabolism. Catabolism is a process which breaks down the food products from the living article to sustain life of the article while eliminating water from the article due to chemical activities. Thus, catabolism reduces the food value of the living article, while any means which will retard the self destruction of the catabolistic process maintains the desirable food elements in the living article for longer periods of time.

It is known that freshly harvested fruits and vegetables contain many vitamins and minerals needed by humans for good health and growth. It is also known that packaging such articles as soon as possible after harvest in a manner which reduces moisture loss, but permits oxygen to enter the package and carbon dioxide to exit the package at relatively slow rates will maintain the fruit in a fresh state for longer periods of time.

SUMMARY OF THE INVENTION

In accordance with the present invention an improved method and apparatus is disclosed for intermittently feeding film to the film clamps of a packaging head so that an annular portion of the film which defines a portion of the package to be formed is firmly clamped without wrinkles transversely or longitudinally of the direction of movement of film. The film feed apparatus also minimizes inertia forces by continuously driving the film supply rolls and forming a controlled loop of film when the film is clamped, which loop is pulled through the clamp when opened by intermittently driven rolls to provide film for the next package and with two strands of waste film being split apart and spread for removal by vacuum boxes.

The invention also includes pairs of annular outer and inner film clamp means which surround the article, and firmly clamp and stretch the film portions over the article prior to sealing and severing but release the outer clamp means and provide slack in the film portion between the clamp means and the intermittently driven film advancing rolls thereby enabling the film portions to be sealed and severed in an isolated relaxed area of the film. The outer film clamps are offset on one side of the inner clamping and sealing plane, and the resilient surfaces of the inner clamp and of the sealing means permit only small deformation of the film. Thus, the film is sealed and severed at isolated film portions which are substantially parallel and are relaxed.

As used in the specification and claims, it will be understood that the term "living article" is an article that undergoes the catabolistic process. "Living article" as used herein includes individual fruit or vegetables of generally spherical configuration such as grapefruit, apples, peaches, tomatoes and the like; and also includes individual or groups of cylindrical or noncylindrical fruit or vegetables. In addition, "living articles" includes articles of non-spherical configuration such as pears, avocados, bananas and potatoes.

It will be understood, however, that the articles to be packaged are not limited to "living articles" but may include other articles such as cheese, eggs, meat or the like which deteriorate during storage. Also, the article may be an inanimate article such as a ball or rock which merely becomes dusty or unattractive when stored in an unwrapped condition for a substantial period of time.

The term "annulus" as used in the specification and claims includes circular as well as non-circular configurations which surround and substantially conform to the shape of the single article or plurality of articles being packaged as a unit. It will be understood that the term "article" is broad enough to cover living articles as well as inert articles.

BRIEF DESCRIPTION OF THE DRAWINGS

FIG. 1 is a front elevation of the stretch wrapper of the present invention illustrating the location of the major components of the wrapper, said catch assembly illustrated in its open position.

FIG. 2 is a side elevation of the apparatus looking in the direction of arrows 2—2 of FIG. 1.

FIGS. 3A and 3B when combined form an enlarged horizontal section of the package forming and sealing mechanism taken along lines 3A–3B of FIG. 1, said mechanism being illustrated in an article and film receiving position.

FIG. 4 is an enlarged transverse section taken along lines 4—4 of FIG. 1.

FIG. 5 is an enlarged elevation looking in the direction of arrows 5—5 of FIG. 1 illustrating concentric components of one of the packaging heads, certain portions being cut away.

FIG. 5A is an elevation similar to FIG. 5 but taken at a smaller scale and illustrating non-circular annular portions of a packing head which is adapted to handle a pear.

FIG. 6 is an enlarged diagrammatic horizontal section taken along lines 6—6 of FIG. 1 with parts omitted to illustrate the packaging heads and an article catching assembly in article-dropping position, and for illustrating pneumatic film clamping means for rigidly clamping the film when being stretched over the article but releasing the outer clamping annuluses when the film is being sealed and severed.

FIG. 7A is an enlarged horizontal section illustrating a portion of both heads in film clamping, severing and sealing position with the film stretched around a portion of an article just as the inner clamp engages the film and with the hot knife approaching the film.

FIG. 7B is an enlarged cross-section through the hot knife illustrating the preferred shape of the knife, said knife making initial sealing and severing contact with the film.

FIG. 7C is a small cross-section similar to FIG. 7B but illustrating the knife and inner clamp in full sealing and severing position at the end of its stroke.

FIG. 7D is a cross-section of a modified form of the spaced resilient annuluses which separately resist the inner clamping force and the sealing force applied by the hot knife with the knife in position to contact the film.

FIG. 7E is similar to FIG. 7D but with the knife fully penetrating the relaxed film being sealed and severed.

FIGS. 8A and 8B when combined form an enlarged diagrammatic elevational view in central vertical section taken along lines 8A-8B of FIG. 2 illustrating the operation of the low inertia of film advancing and controlling mechanism of the present invention.

FIG. 9 is a diagrammatic horizontal section with parts omitted, taken along lines 9—9 of FIG. 8A illustrating the air jet control for the film loops, and the article feed mechanism with the upper gates supporting an article and the lower gates in dotted lines in their open position.

FIG. 10A is a side elevation of one of the outer clamping annuluses illustrating the manner in which the film is centered transversely by overlapping the film over the edges of a portion of the annulus.

FIG. 10B is a central section taken along lines 10B—10B of FIG. 10A.

FIG. 10C is a section taken along lines 10C—10C of FIG. 10A.

FIG. 10D is a diagrammatic view illustrating the vacuum boxes and the structure for splitting and spreading the scrap film.

FIGS. 11-16 are operational views illustrating the package forming heads in progressive operative positions.

FIGS. 17A and 17B when combined, define a pneumatic diagram illustrating a pneumatic circuit for operating the several components of the stretch wrapper.

FIG. 18 is an electrical diagram illustrating the input functions, and output functions of a programmable controller.

FIGS. 19A-19D is a diagrammatic representation of an electrical control circuit including components of the controller and components externally of the controller.

FIG. 20 is a timing diagram taken during a diagnostic check with a strip chart recorder when the wrapper was set to operate at 42 fruit per minute (1.43 seconds per cycle).

DESCRIPTION OF THE PREFERRED EMBODIMENT

In general, the article packing mechanism or stretch wrapper 20 (FIGS. 1 and 2) of the present invention includes a package forming and sealing mechanism 22 defined by two packaging heads 24,26. Each packaging head 24,26 includes a pair of outer film clamping annuluses 28,30 which capture portions of the film strips F pulled therebetween by a low inertia film drive system 33 (FIG. 8A) which includes an upper film drive mechanism 34 that cooperates with a lower film drive mechanism 36 to intermittently advance the film strips F off associated feed rolls 38 with the film remanent being fed downwardly out of the wrapper for subsequent collection and sale as scrap film. An article feed mechanism 40 directs articles A (FIGS. 9 and 12-16) one at a time between film portions captured by each head 24,26. The article is received by a catch assembly 42 (FIGS. 1, 2, 6 and 8A) which gently receives and holds the article in sealing position. As the packaging heads 24,26 are extended to seal the article within the captured film portions and then severs the resulting package from the scrap film, the catch assembly 42 moves out of catching position. The packaged article is released in response to retraction of the packaging heads and is received by discharge means such as a discharge chute 43 and take-away conveyor (not shown). The above components are all supported by the main frame 44.

The package forming and sealing mechanism 22 (FIGS. 1-3A, 3B and 6) includes a sub-frame 46 that is supported on the main frame 44 by end brackets 48 (FIG. 1). The sub-frame 46 include end support plates 50,52 bolted to the adjacent brackets and drilled to receive a pair of spaced head supporting shafts 54,56 (FIGS. 3A and 3B) that are rigidly secured to the plates 50,52. As indicated in FIGS. 3A and 3B, the shafts 54,56 are oriented in a horizontal plane and slidably support the packaging heads 24,26.

The packaging head 24 (FIG. 3A) comprises a mounting plate 60 which is bolted to bearing plates 62 with bushings 64 rigidly secured thereto and slidably receiving the associated support shafts 54,56. Each bearing plate also carries a stop bolt 66 screwed therein and locked in position by a locknut. When in the illustrated article receiving position, the stop bolt 66 engages a standard well known shock absorber 67.

Four sleeves 68 (one being shown in section in FIG. 3A) are welded to the mounting plate 60 near its corners. Ball bushings 74 in each sleeve 68 slidably receives a rod 76 which extends completely through and projects outwardly from both ends of the associated sleeve 68. One end of each rod 76 has a resilient cap 78 secured thereto for cushioning engagement with an adjustable stop bolt 80 that is secured to the support plate 50 when the packaging head 24 is in the position shown in FIG. 3A. A spring 82 on each rod 76 is disposed between the associated sleeve 68 and locknuts 84 screwed on the rod 76. The pair of outer film clamping annuluses 28,30 (FIGS. 3A and 6) of the head 24 defines an outer film clamp generally designated 90. The annulus 28 of head 24 is slidably supported on the inner end portions of the four rods 76, and the annulus 30 is connected to a reduced diameter portion of each rod 76 by snap rings 96. The annuluses 28,30 are urged apart by a spring 100 on each rod 76, and the maximum amount of separation is limited by snap rings 101 secured to each rod 76 as shown in FIG. 3A. However, when the heads 24 and 26 are in film clamping position, the annulus 28 is urged away from the snap rings 101 and will be described later.

The annulus 28 includes an annular resilient clamping pad 102 faced by a thin metal or Teflon strip to prevent sticking of the film to the pad after the two cooperating annuluses 28,30 have been separated by the springs 100 as shown in FIG. 3A.

It will be appreciated that the springs 82 (FIG. 3A) will urge the associated annuluses 28,30 towards mounting plate 60 until locknuts on a tie bar 216 come against a plate 214 after the packaging heads 24,26 have moved toward each other to separate the resilient caps 78 from the bolts 80 as shown in FIGS. 13-16.

An inner film clamp 110 (FIGS. 11-14) is provided for clamping the two film strips F together inwardly of the captured portion for isolating annular strips of film. The inner film clamp 110 includes a pair of thin resilient annuluses 111,112 on the sealing head 24 and a cooperating annulus 114 (FIG. 3B) on the sealing head 26. The resilient annuluses 111,112 (FIG. 3A and FIGS. 7A-7C) are secured to the mounting plate 60 by a ring 115 and a plurality of shouldered studs 116 (FIG. 3A) and cooperating nuts. The resilient annuluses 111,112 are covered by Teflon tape or the like to prevent the film F from sticking thereto. The studs 116 are sized to position the resilient annulus 112 a sufficient distance from the mounting plate 60 to prevent the film from contacting either the mounting plate 60 or the annulus supporting components when the film is stretched around the article to be packaged as shown in FIGS. 13, 14, 15 and 16.

As will be described hereinafter, means are provided to open the outer clamps prior to sealing and severing the film so that isolated annuluses 119,119a (FIGS. 7A-7C) of film between the inner and outer film clamps will be relaxed during sealing and severing of the film.

Power means such as an air cylinder 118 (FIG. 3A) is connected between the end support plate 50 and the mounting plate 60 for moving the packaging head 24 between the film feed position shown in FIGS. 3A and 3B and the film sealing position best illustrated in FIG. 15.

Since many of the components of the packaging head 26 are the same as those described in connection with the packaging head 24, only the differences will be described, and equivalent components of the head 26 will be assigned by the same numerals used to describe the head 24 followed by the letter "a".

The packaging head 26 (FIGS. 3B and 6) includes the mounting plate 60a (FIG. 3B) which is connected to the previously mentioned end support plate 52 by an air cylinder 118a for moving the head 26 simultaneously with the head 24 between the article feed position illustrated in FIG. 1 and the film sealing position illustrated in FIGS. 15 and 16. The packaging head 26 also includes a resilient clamping pad 102a (FIG. 3B) and film contacting metal or Teflon strip.

As previously mentioned, the bearing plates 62 (FIG. 3A) of the packaging head 24 are slidably received on the support shafts 54,56. Each plate has a standard well known cushioning assembly or damper 120 secured thereto. Each damper includes a cushioned plunger 122 slidably received in a cylinder 124 for reducing impact and for slowing inward movement of the two packaging heads 24 and 26. Each plunger 122 contacts an adjustable stop bolt 126 (FIG. 3B) during the last approximately 1 inch of travel into their sealing positions.

The annulus 28 of the packaging head 26 differs from the equivalent part of the head 24 in that it is air cooled and includes an annular air cooling passage 140 (FIG. 3B) formed therein. Cooling air from an air pump (not shown) is directed through inlet conduits 142 and 146 for discharge from the annular passage through a plurality of radial passages 144. The cooling air from the passages 144 is directed against the film seal area of the strips F to cool the film strips after they have been sealed together about the article A.

The inner annulus 114 (FIGS. 3B, 4 and 5) of the inner film clamp 110 includes a plurality of spider legs 148 which connect the annulus 114 to a pair of plates 150,152 (FIG. 3B) that are secured together and are provided with a coolant passage 154 therein. Although cooling may not be required at low speeds, if cooling is required at higher speeds, cooling air or water from a conduit 156 is directed through the passage 154 and subsequently discharges the cooling fluid through a conduit 158. The plates 150,152 are rigidly connected to the mounting plate 60a by a plurality of shouldered bolts 160 or the like which extend through holes in a hot knife mounting plate 162. The hot knife mounting plate 162 is carried by and reciprocates with the mounting plate 60a in response to actuation of the air cylinder 118a, and is also reciprocated relative to the plate 60a as will be described hereinafter.

Since the outer clamping means 28,30 (FIG. 1) of the packaging heads 24,26 firmly clamp and isolate portions of the film strips that are parallel to each other, it will be apparent that the central portions of the captured film will initially contact the articles. These central portions of the captured film will tend to cling to the article and accordingly will stretch very little. Since these central portions stretch very little it is possible to mark the film at each central portion prior to moving the film into the packaging machine 20 without requiring the use of distorted printing techniques.

An electrically heated hot knife 164 (FIGS. 3B and 6) is mounted on a ring 166 in a conventional manner and is connected to the mounting plate 162 by a plurality of spaced legs 168. An air cylinder 170 is secured to the mounting plate 60a and has a piston rod 172 therein that is connected to the plate 162. A resilient bumper 174 is adjustably mounted on the piston rod to limit the depth of penetration into pad 112 (FIG. 3A) by knife 164 when the knife 164 is moved between the inactive position of FIG. 3B and the active sealing and severing position illustrated in FIGS. 14 and 15, at which time the isolated relaxed portions 119,119a of the captured film are urged against the resilient annulus 112 of the sealing head 24 for heat sealing and severing the film as clearly shown in FIGS. 14-16.

It will be appreciated that it is undesirable to seal the outer or scrap portions of the two film strips together after severing the article packaging portions from the film. It will also be apparent that it is desirable to provide a strong seal between the two captured film portions of the strips which form the package.

Accordingly, as best illustrated in FIGS. 7A and 7B, the shape of the annular hot knife 164 in cross-section is such that the film engaging annular tip 200 (FIG. 7B) of the knife 164 will form a puddle of plastic on the annular inner (or package forming side) of the contacted film strips F while providing very little puddling on the outer or scrap side of the film. It has been found that providing an inner surface 202 of arcuate cross section having a radius within the range of about 0.005 to 0.060, preferably about 0.015, will provide a desirable puddling of molten film on the package side of the film. It has also been determined that a good seal is provided if the inner surface 204 of the tip 200 is at an angle of about 15° relative to a reference line 206 which passes through the center of the inner arcuate surface 202 and is normal to the film strips F. The surface 204 and the reference line 206 preferably intersect to provide an outer annular edge 208 that is normal to the sealing plane illustrated in FIG. 7B.

The relatively flat angle of the outer surface 204 assures sufficient heat migration from a standard heating element 210 (FIG. 7B) in the hot knife 164 to assure proper heating of the arcuate surface without cooling during operation of the stretch wrapper 20.

A feature of the invention is the provision of the previously mentioned spaced resilient sealing annuluses 111,112. FIGS. 7A, 7B and 7C, include thin resilient sealing pads or annuluses 111,112, which resist the force of the inner clamping annulus 114 and the sealing force of the knife 164, respectively. By using two thin resilient sealing annuluses 111,112, it has been determined that the considerable clamping force provided by the inner clamping annulus 114 will compress the resilient annulus 111 only a minor amount as indicated in FIG. 7C. Furthermore, since two annuluses 111 and 112 are used, compression of the annulus 111 will not disturb the desired parallel relationship of the portions of the film strips 119,119a to be sealed and severed by the knife 164 as indicated in FIG. 7A. When the knife 164 engages the film strips and seals the same, the strips will remain parallel thereby providing a better seal than would occur if the film strips were not at right angles relative to the direction of movement of the knife.

It has also been determined that a more effective seal is provided when both strips 119,119a (FIG. 8A) are held in intimate contact, a condition which can be achieved when both strips are pulled over one edge of the annulus 112 as indicated in FIG. 7A prior to being released from the outer clamp and being sealed and severed by the hot knife 164. This is controlled through adjustment of the rods 216,216a, as described below.

FIGS. 7D and 7E disclose a modified form of a clamp resisting annulus 111' which will be compressed a greater distance than the thin resilient annulus of FIGS. 7A and 7B.

It has been determined that for high speed packaging operations that the force of the springs 82 and 82a (FIGS. 3A, 3B and 6) is insufficient to clamp the film with sufficient force to completely immobilize the clamped film when the outer film clamping annuluses 28,30 of the two packaging heads 24,26 have captured portions of the film and are moved toward each other to stretch the film over the article. Also, it's desirable to control film travel independently of the head motion.

Accordingly, each packing head 24,26 is provided with a pair of pneumatic film clamping cylinders 213,213a (only the upper cylinders being illustrated in FIGS. 3A,3B and 6). Each cylinder 213,213a is secured to the horizontal bar 214,214a secured in fixed position by nuts to the associated rods 76,76a. When the heads 24,26 and cylinders 213,213a are in fully retracted positions illustrated in FIGS. 3A, 3B and 6, the rear end of each cylinder 213,213a engages a shock absorber and their piston rods are connected to push rods 215,215a which extend through openings in the mounting plate 60,60a to engage the associated clamping annulus which is open at this time. The cylinders 213,213a are extended to cause the push rods 215,215a to firmly clamp the associated annulus 28,30 into firm clamping engagement with the film with sufficient force to prevent film slippage when the film is being stretched over an article, prior to the extension of cylinders 118,118a. Tie bars 216,216a are secured to the mounting plate 60 and are slidably received in holes in the bars 214,214a and have nuts thereon which limit rearward movement of the outer annuluses 28,30 relative to the mounting plates 60,60a. When the heads 24,26 are extended by cylinders 118,118a (FIGS. 3A and 3B), the springs 82,82a maintain contact of resilient caps 78,78a against stop belts 80,80a until mounting plates 60,60a has moved tie bars 216,216a against bars 214,214a after which time annuluses 28,30 accompany the motion of plate 60,60a. It can be appreciated that adjustment of the rods 216,216a fixes the positions of the outer annuluses 28,30 relative to the inner clamp 110, FIG. 7A. Immediately prior to sealing, the push rods 215,215a of each cylinder are retracted thereby permitting the springs 100,100a to open the outer clamping annuluses while the inner clamp retains the film tensioned over the article so that the two films may be sealed and severed in a completely relaxed area of the film.

When the articles being handled are cylindrical articles such as grapefruit, a circular centering disc 217 (FIG. 3A) is mounted near the plane of the captured film portion for stabilizing the grapefruit when fed into packaging position between the two packaging heads 24,26. The disc 217 is secured to the cylinder 118 by a pair of rods 218 and a mounting plate 219.

An important feature of the invention is the provision of an improved low inertia drive system 33 (FIGS. 8A and 8B) which is designed to provide transverse and longitudinal tension on the film prior to capturing the film with the outer film clamps 90. Also, the low inertia film drive system includes means for releasing tension on the film during sealing and severing of the film as will be described below.

The low inertia film drive system 33 (FIGS. 1, 8A, 8B and 9) is designed to provide continuous film advancing forces to each film strip at a location above the sealing and severing heads 24,26 while providing an intermittent film advancing force at a location below the heads 24,26. The film driving forces above the heads form loops 236,238 of film when the film is clamped from movement by the heads 24,26 when the heads are in the solid line position of FIG. 8A, at which time the lower film drive mechanism 36 does not move the film F. When the heads 24,26 are moved to their article receiving positions and the outer film clamps 90 of the heads 24,26 are released as illustrated in dotted lines in FIG. 8A, the lower film drive mechanisms 36 pull the film strips F downwardly thereby removing (or substantially removing) the film loops 236,238 each time the film strips are advanced. Thus, the only inertia to be overcome during film feed is that of the accelerated portions of the film strips F.

The upper film drive mechanism 34 comprises a motor 240 (FIG. 1) connected to a pair of drive sprockets 242,244 by an endless chain 246 and an idler sprocket 247. The sprocket 242 is keyed to a shaft 248 journaled on the frame 44 and having a resilient film engaging drive roll 250 thereon. One film strip F is disposed in driving engagement between the roll 250 and an associated idler roller 251, which idler roller is secured to a shaft 252 journaled on the frame.

The drive sprocket 244 is similarly secured to the shaft 256 having a resilient feed roll 258 secured thereto and cooperating with an idler roll 260 on a shaft 262 which continuously drives the other film strip F as illustrated in FIG. 1. The two film strips F are then trained between the associated outer clamping annuluses 28,30 of the packaging heads 24,26.

An important feature of the upper film drive mechanism 34 is that the feed or supply rolls 38 be positioned closely adjacent the associated nip rolls 250, 251 or 258,260; and that these rolls be closely adjacent the associated clamping annuluses 28,30 in order to maintain better control and centering of the film F in the clamping annuluses 28,30. The supply rolls 38 are spaced about 6 inches from the associated nip rolls 250, 251 (or 258,260); and a spacing between the nip rolls and the clamping annuluses 28,30 of about 7½ inches is satisfactory when the film is very thin (about 0.005 inches thick) and a minimum of about 7 inches wide, but preferably about 7.25 inches wide when handling grapefruit.

In order to maintain better control of the film loops 236,238 (FIG. 8A); each packaging head 24,26 has a lower guide plate 263 which is secured to the upper end of the associated clamping annulus 28 and has its upper end supported by hinge 264 connected between the plate 263 and the cross bars 214,214a secured to the rocks 76,76a. Each nip roll 251,258 is provided with an annular groove 266 each of which receives a film stripping finger 267 that is secured to the frame 44. Similarly, each roll 250,260 is provided with annular grooves 268 to receive looped film stripping fingers 269 secured to the frame 44.

A pair of air conduits 270 (FIGS. 8A and 9) having nozzles 271 (FIG. 9) are mounted on the frame 44 and receive high pressure air from a cross conduit 272. Air at high pressure is directed through the nozzle 271 as jets in a direction normal to the associated loops 236,238 thereby maintaining control of the loops as indicated in FIGS. 8A and 9.

In order to remove both transverse and longitudinal wrinkles from the film F before the film is clamped by the outer clamp 90, the dimensional relationship of the annulus 28 of each clamp relative to the film width is important. As best illustrated in FIG. 10A, each annulus 28 includes a backing plate 272 having a raised film contacting ring 273, which supports the resilient annulus clamping ring therein, and which is narrower than the film thereby causing the longitudinal film edges to overlap the ring as indicated in FIGS. 10A,10B and 10C. When the film is pulled taut by the lower film drive system 36, the longitudinal edges of the film are pulled over the edges of the ring as indicated in FIGS. 10A,10B and 10C; and also over the lower edge 274 of the backing plate thus applying tension longutidinally and transversely of the film thereby removing all wrinkles from the film portion which is eventually captured when each outer clamp 90 is closed. A cylindrical bar 275 is rotatably supported by the upper end of the backing plate 272 to assist in maintaining the film properly spread when entering the outer clamp 90.

As shown in FIGS. 4, 8B and 10D, after the package has been formed and the film has been severed and sealed, the remaining scrap film has a hole therein and is split at the longitudinal centerline of the film and then separated as it is moved out of the heads 24,26 and before it reaches the lower film drive mechanism 36. Each scrap film portion is pulled over an electrically heated hot knife 276 secured to the associated outer clamping member 28 by an insulated connector 277. A film spreader 278 is also connected to each outer clamping member 28 and spreads the two scrap film halves F' and F'' of each film strip F as best shown in FIG. 10D. The film halves F' and F'' are then drawn in narrow V-shaped vacuum boxes 279 having their upper ends in close proximity to lower pairs of film feeding rolls 284,286 as shown in FIGS. 8B and 10D.

The lower film drive mechanism 36 (FIGS. 1, 3A and 8B) receives the scrap film with the packaged forming portions of the film removed therefrom. The mechanism 36 includes two pair of drive rollers 284,286 mounted on shafts 288,290 journaled on the frame 44. The film engaging surface of each pair of rollers 284,286 is relatively soft so that the cooperating pairs of rollers will engage the film F with sufficient force to rapidly pull the film through the associated packaging heads 24,26 when the heads are in the article receiving position of FIG. 1 and outer annuluses 28,30 are unclamped, but will slip over the film without damaging the film when the outer annuluses 28,30 are in clamping engagement with the film. The surface of the rollers 284 and 286 is similar to that of well known soft surfaced paint rollers.

The pairs of rollers are driven at relatively high speed by a motor 292 through a pneumatically operated clutch 293 (FIG. 3A) and an endless chain 294 (FIG. 1) trained around the roller drive sprockets 296,298 that are secured to the shafts 288,290 and around a plurality of idler sprockets 302 journaled on the frame. The chain 294 is also trained around the smaller sprocket 299 of a speed reducing mechanism 300 having a large sprocket 301 connected to a clutch sprocket 293' by a second chain 303.

The purpose of the clutch 293 is to stop the pairs of film drive rolls 284 and 286 by declutching the rolls before the sealing heads 24,26 reach the sealing positions shown in FIG. 8B. However, even though the rolls are declutched, they still grip the film with sufficient force to retain tension in the lower portion of each film strip S.

In order to release this retained tension, a tension releasing mechanism 304 (FIGS. 5 and 8B) is provided for each head 24,26. Each mechanism 304 is illustrated in solid lines in the position it assumes when withdrawing film from the declutched rolls, and is illustrated in phantom lines in its tension releasing position. Each mechanism 304 comprises a pair of generally L-shaped links 305 (FIGS. 5 and 8B) pivotally connected to the bottom of the associated outer clamp annulus 28 and having a horizontal film engaging rod 306 rigidly secured thereto. A single link 307 is pivotally connected to a yoke 308 secured to the center of the rod 306 and to a split block clamp 309 rigidly secured to the associated push rod 215 or 215a.

The article feed mechanism 40 as best illustrated in FIGS. 2, 8A and 9 is designed to feed a spherical article A, such as grapefruit, one at a time between the packaging heads 24 and 26. A conveyor or the like (not shown) directs a single row of articles A into an upright article guide or magazine 340. The magazine 340 is defined by four bars 342 (FIG. 9) which extend downwardly to a point immediately above the packaging heads 24,26. In order to feed one article at a time into the heads 24,26, an upper pair of article singulating gates 344 and a lower pair of gates 346 are alternately opened and closed in timed relation with the movement of the heads 24,26.

The upper and lower gates 344,346 (FIGS. 8A and 9) each includes an article supporting plate which is contoured to conform to the engaged surface of the article. Each upper gate 344 (FIG. 2) is secured to the piston rod 348 of an associated upper air cylinder 350. Similarly, piston rods 351 of lower air cylinders 352 support the lower gates 346. The gates are each maintained in article supporting position by a guide pin 358 (FIG. 9) secured thereto and slidably received in a hole in an associated mounting bracket 360 secured to the frame 44.

An electric eye 362 (FIG. 9) and a reflector 364 are mounted on the brackets 360 in a position between the upper gates 344 and lower gates 346 to detect the absence of an article A in position to be fed between the packaging heads 24,26. If an article is present in the feed position an article will drop at the appropriate time; If an article is not present the gates 344 and 346 will be held stationary.

Each article A when fed by the article feed mechanism 40 into the sealing heads 24,26, is gently received by the catch assembly 42 (FIGS. 2 and 6) which holds the article in centered position relative to the packaging heads 24,26 (which heads are offset to the left as illustrated in FIG. 7A) until the captured film portions are partially stretched over the article and maintain control of the article. The catch assembly 42 is then retracted.

As best shown in FIGS. 2 and 6, the catch assembly 42 comprises a pair of air cylinders 380 each connected between the frame 44 and an arm 382 pivoted at 384 to the frame 44. An article catching wing assembly 386 is secured to the upper end of the associated arm 382. Each wing assembly 386 comprises a pair of wings (FIG. 6) connected together by a hinge 388 and urged outwardly by a spring (not shown). As illustrated in solid lines in FIG. 6, the wings are pivotally spread apart to substantially cradle an article received from the feed mechanism 40 when the package forming heads 24,26 are in article receiving position. When the heads 24,26 are moved toward each other in package forming position, the wings of the wing assemblies 386 are contacted by the heads and pivot toward each other in order to fit between the heads. Each wing preferably includes a shock absorbing article engaging surface 390 such as a resilient bead or rubber tubing for minimizing damage to an article A such as fruit.

As shown in FIG. 2, the arms 382 and wing assemblies 386 are in their article catching position. At this time the lower gates 346 will open. When the article drops into the catch wings 386, the shock absorbing article engaging surface 390 minimizes damage to the articles such as fruit or vegetables. The wings 386 catch and center the article relative to the heads 24,26 with the aid of the centering disc 217 (FIG. 3A) to minimize unequal stretching and resultant tearing of the film.

It will be noted that one wing of each wing assembly 386 includes one wing which is normal to the axis of movement of the heads 24,26; and another wing which is angled relative to said axis. The reason for this lack of symmetry is that the packaging heads 24,26 are not centered with the feed mechanism 40 when they are in film sealing position (FIG. 7A) so that both relaxed film portions 119,119a will be stretched over the same edge of the resilient pad 112 to provide coplanar film surfaces during sealing.

After the captured portions of a film in the package forming heads 24,26 gain control of the article, the air cylinders 380 are retracted to move the wing assembly 386 of the catch assembly 42 outwardly away from the film strips F and away from the article thereby allowing the article A to be gripped by the film and packaged. The packaged article thereafter drops into the chute 43 for removal by a discharge conveyor or the like (not shown).

A pneumatic diagram 400 for the several air operated components of the stretch wrapper 20 is illustrated in FIGS. 17A and 17B. High pressure air from a source (not shown) enters main conduit 402 through a filter regulator 404. The packaging head cylinders 118, 118a are extended and receive high pressure air through a spring return solenoid operated valve V1. The valve V1 is illustrated as being in its parallel passage position which blocks flow of high pressure air therepast. When a solenoid Y0 is energized, high pressure air flows through a cross passage in valve V1, through an adjustable speed control valve 406, and is blocked from flow by a check valve 408 that is disposed in a parallel circuit with the flow control valve 406. The high pressure air then enters the closed end of cylinders 118,118a thereby moving the packaging heads 24,26 from their article receiving positions of FIG. 11 to their packaging positions of FIGS. 14 and 15. Air is then discharged from the rod end of the air cylinders 118,118a through cross-passages in pilot operated quick-exhaust valves 413,413a. The valves 413,413a are spring urged into the illustrated positions by springs and are shifted to the exhaust position by high pressure in the piston ends of their associated cylinders.

When it is desired to retract the cylinder 118,118a, solenoid Y0 is de-energized returning valve V1 to its illustrated parallel passage position, and solenoid Y1 is energized shifting the valve V2 to its cross passage position. High pressure air is then directed through a speed control valve 412, that is in parallel with the check valve 410, and enters the rod ends of the cylinders 118,118a thereby retracting the cylinders with the air in the piston ends thereof being discharged through pilot operated quick-exhaust valves 415,415a.

The hot knife or blade cylinder 170 is held in retracted position by air flowing through parallel passages in a valve V3 when the solenoid Y2 is de-energized. When retracting the cylinder 170, air is discharged from the piston end thereof through a speed control valve 414 and a parallel passage in valve V3. When the solenoid Y2 is energized, valve V3 is shifted to its cross passage position thereby extending the piston rod of cylinder 170 and moving the hot knife 164 from the FIG. 14 position to the FIG. 15 position.

The article catcher 42 is controlled by valve V4 actuated by a solenoid Y3. When the solenoid is de-energized, high pressure air flows through a parallel passage in the valve V4, a speed control valve 416, and into the piston end of the air cylinder 380 (only one being shown) to extend the piston rods and move the article catcher to its operative position. Air is discharged from the rod end of the cylinders 380, flows through a check valve 418 and flows through a parallel passage in the valve V4. When the solenoid Y3 is energized, high pressure air flows through a cross passage in valve V4, through a speed control valve 420 into the rod ends of the cylinders 380 thereby retracting the piston rods to move the catcher 42 into its inoperative or open position shown in FIG. 6. Air is discharged from the rod ends of the cylinders 380 through a check valve 422 and a cross passage in valve V4.

The cooling air supply for cooling the seal bead is controlled by a valve V5 operated by a solenoid Y11. When in its illustrated de-energized position, high pressure air is blocked from flow past valve V5. When the solenoid Y11 is energized, the valve V5 is shifted to cross passage position directing high pressure air through a speed control valve 424 and into the annular passage 140 in the annulus 28 for flow out of ports 144 against the film seal to cool the same.

The four cylinders 350,352 of the article feeder are controlled by a valve V6 (FIG. 17B) which is spring loaded into the illustrated parallel passage position and is shifted to the cross passage position by energizing the solenoid Y5. Flow of high pressure air through a parallel passage of the valve simultaneously enters the piston ends of the cylinders 352 thus closing the lower gates 346; and enters the open end of the cylinders 350 thus opening the upper gates 344. At this time low pressure air is directed out of the other end of the cylinders 350,352 through the other parallel passage in valve V6. Energization of solenoid Y5 directs high pressure air into the piston ends of the cylinders 350 to close the upper gates 344; and into the rod ends of the cylinders 352 to open the lower gates 346 and feed an article into article catcher 42.

The pneumatic film clamps are controlled by a valve V7 actuated by a solenoid Y4. When the solenoid Y4 is de-energized, high pressure air flows through a parallel passage in valve V7 into the closed ends of the cylinders 213 and 213a to extend the piston rods to the film clamping position. Air in the rod ends of the cylinders is discharged through the other parallel passage in valve V7. When the solenoid Y4 is energized, the valve V7 is shifted to its cross passage position and high pressure air flows through a cross passage to the rod ends of the cylinders to retract the piston and unclamp the film. The air in the piston ends of the cylinders is discharged through a cross passage in valve V7.

The air needed for controlling the film loops 236,238 is controlled by a valve V8 operated by a solenoid Y8. When the valve V8 is in the cross passage position, high pressure air will be blocked from flow past the valve V8. When the solenoid Y8 is energized, the valve V5 is shifted to its parallel passage position thereby directing high pressure air through loop air conduits 270 and nozzles 271 to maintain control of the loops 236,238 (FIG. 8A).

The brush roll clutch 293 of the lower film drive mechanism 36 (FIG. 1) is controlled by valve V9 operated by solenoid Y12. When valve V9 is in its cross passage position, high pressure air is blocked from flowing past the valve V9, and the clutch 293 is de-energized by resilient means (not shown). When the solenoid Y12 is energized, high pressure air is directed into the clutch to energize the clutch and thereby rotate the lower film engaging rolls 284,286 (FIG. 8B).

The several components of the article packaging machine 20 are controlled by a programmable controller 450 (FIG. 18) which controller is preferably a Texas Instrument Model 5T1-1010 programmer which is manufactured by Texas Instruments, Inc., 34 Forrest, Attleboro, Mass. 02703.

An electrical circuit 451 (FIGS. 18, 19A-19D) diagrammatically illustrated the electrical components of the packaging machine 20 including the controller components; and will be described in conjunction with the functions performed by the machine.

The circuit 451 is connected between −12 V main line L1 and +12 V main line L2. FIG. 18 illustrates a plurality of switches connected to selected inputs X0-X15 of the controller 450; and a plurality of solenoids and the like connected to selected outputs Y0-Y15 of the controller. The functions of the several electrical components are also given.

FIGS. 19A-19D represent the internal functions performed by the controller 450 in combination with other electrical components of the machine 20. For convenience in locating the several electrical components, the lines in which the components are located are numbered adjacent the main line L1 in FIGS. 19A-19D.

To aid in identifying the several electrical components in FIGS. 19A-19D, it will be noted that the controller "inputs" are identified by X0-X15; the controller "outputs" are identified by Y0-Y15; and the several switches are identified by S followed by the numeral assigned to the corresponding controller input. The contacts associated with the several controller inputs and outputs are identified by X and Y respectively, plus the corresponding number; while the contacts CR of the corresponding control relays CR will be followed by the numerals assigned to the associated relays.

When a three position switch S9-10 (FIG. 18) is at "reset", normally closed contacts X9 and X10 (FIG. 19A-line 0) are closed thereby energizing reset control relay CR100. Thus, the reset terminal of switch S9-10 (FIG. 18) allows the controllers to treat it as an input even though there is no physical signal from the switch position. When switch S9-10 is positioned on "step" or "cycle" contacts X9 or X10 (line 0) opens thus de-energizing relay CR100.

In order to operate the packaging machine 20 so that it automatically makes a plurality of cycles, the three way switch S9-10; along with switches S0,S3, and S5 (FIG. 18) are placed in the "auto" or "cycle" mode. Power is then directed to input X10.

Having reference to line 5 (FIG. 19A), the interlock control relay CR21 is energized when film drive contact X0, brush roll contact X3, and film clamp contact X5 have been closed by placing the associated switches on "auto"; vacuum actuated switch LS6 closes when adequate vacuum is present thus closing vacuum contact X6; hot wire contact X4 is closed by placing switch X4 to the "on" position, sealing blade contact X1 is closed by placing switch S1 to the "on" position and normally closed relay contact CR33 remains closed unless the packaging heads exceed a predetermined time to become fully extended as will be described in more detail hereinafter. More particularly, vacuum contact X6 is closed by closing vacuum switch LS6 (FIG. 18) in response to the film scrap vacuum being adequate (about 0.8 inches of water). When CR21 is energized red fault light Y10 (line 150) is off since normally closed contact CR21 is opened.

Closing start switch S8 (FIG. 18) will energize control relay CR26 (line 10) which latches itself, i.e., closes CR26 (line 11) thereby providing a holding circuit across contact X8. Contacts X10 and CR21 are closed at this time since three way switch S9-10 (FIG. 18) is at "cycle" (input 10), and relay CR21 (line 5) is energized. If any one of the interlock component (line 5) opens, CR21 is de-energized thus de-energizing CR26. For example, if the vacuum interlock component X6 opens due to insufficient vacuum, CR26 will not reenergize until the vacuum condition is corrected closing X6 and energizing relay CR21 which closes contact CR21 (line 10); and start switch S8 is manually closed again thereby closing contact X8 (line 10). Thus, operator action is required to restart the machine 20 for automatic operation.

Lines 15–26 provide a protective warning/diagnostic function by flashing red light Y10 (line 150) when one or more of the seven functions in line 5 has changed state and when the three way switch S9–10 is on "cycle". Light Y10 (line 150) is "off" when the interlocks (in line 5) are operating properly; the light Y10 is "on" when an interlock is not operating properly; and the light Y10 blinks "on" and "off" when the interlock changes and then corrects itself. CR26, when energized, closes relay contact CR26 (line 15) thus energizing relay CR29 (line 15) through closed contact X10 which closes contact CR29 (line 16) thereby latching itself. Energized relay CR29 also enables a timer TMR-1 (line 21) by closing contact CR29 which will not time until CR26 is de-energized due to a bad interlock. In response to a bad interlock, timing is started and after 5 counts of 0.1 second (½ second) it will energize CR27. CR27 turns on fault light Y10 (line 150) and starts a timer TMR-2 (lines 25,26) by closing both contacts CR27 (lines 25–26). Closing the lower contact CR27 (line 26) enables the timer TMR-2, while closing the upper contact CR27 (line 25) initiates the timer; duration of the timed interval is the count set on timer TMR-1 (0.5 seconds) After five counts (0.5 seconds) CR28 is energized which opens contact CR28 (line 21) and turns off timer TMR-1 which in turn de-energizes relay CR27 opening contact CR27 (line 26) thereby de-energizing timer TMR-2 which de-energizes relay CR28 closing contact CR28 (line 21) which resets timer TMR-1 turning on blink light relay CR27 after 0.5 seconds. Thus, the blink light relay CR27 (line 20) alternately closes and opens contact CR27 (line 151) which turns light Y10 on and off every half second until the three position switch S9–10 (FIG. 18 is switched out of "cycle".

Upon correcting the defective interlock component, the switch S9–10 is placed in "cycle" for continuous operation of the machine which occurs after start switch S8 is closed and relay CR26 is energized. Closing start switch contact X8 (line 30) energizes relay CR14 through closed contact CR26 and normally closed contact CR11. Energization of relay CR14 also closes contact CR14 (line 31) thereby latching start switch contact X8 after the start switch has been released. The "run" command is thus held until relay CR11 (line 35) is energized.

Closing "start" switch S8 (FIG. 18) also closes contact X8 (line 40) which is in series with closed contact CR26 thereby energizing relays CR20,CR19 and recorder solenoid Y15 (lines 40–43). Energization of relay CR20 closes contact CR20 (line 146) which cooperates with closed vacuum switch contact X6 and closed hot wire switch contact X4 to energize solenoid Y9 thereby driving the brush roll motor 292 (FIG. 1) and also to close contact Y9 (line 175) thereby energizing solenoid Y12. Solenoid Y12 shifts valve V9 (FIG. 17B) to its parallel position thus energizing the brush roll clutch 293 (FIGS. 1, 17B). Energizing the relay CR19 energizes the film drive and loop air solenoid Y8 (line 140) through closed contact CR19 and normally closed contact CR18 (line 141), thereby driving the film drive motor 292 (FIG. 1) and directing jets of air at the film loops. Energization of recorder solenoid Y15 (line 41) starts an optional plug in strip chart recorder (FIG. 18) for preparing timing diagrams such as shown in FIG. 20.

Energization of relay CR14 (line 30) also closes relay contact CR14 (line 36) thereby energizing dwell counter CTR-1 through previously closed contacts X10 and Y0 (line 36). The counter CTR-1 counts once each time timer pulse relay CR0 (line 100) is energized through normally closed relay contact CR0 (line 100), which occurs every 1/60th of a second thus alternately closing and opening contacts CR0 (line 35) and CR0 (line 100). The dwell counter CTR-1 counts 30 pulses (0.5 seconds) and then energizes relay CR11 (line 36). The 0.5 second dwell provided by the dwell timer CTR-1 assures that the brush roll motor, the film drive motor and the recorder motor are up to running speed before the machine actually begins wrapping.

Energization of relay CR11 (line 35) opens normally closed relay contact CR11 (line 30) thereby de-energizing relay CR14. Energization of recorder solenoid Y15 (lines 40–43) closes contact Y15 (line 41) which cooperates with either contact CR14,CR17, or CR16 to provide a holding or latching circuit across start switch contact X8 in line 40. When relay CR11 (line 35) is energized, it closes contact CR11 (line 50) thus energizing relay CR15 and closing contact CR15 (line 51) to latch CR15 (line 50). Control relay CR11 (line 35) is subsequently de-energized when contact Y0 (line 36) of extended head solenoid Y0 (FIG. 18)is energized, which opens normally closed contact Y0 (line 36).

A cycle counter CTR-2 (lines 45 and 46) is preset for the desired number of articles in a batch to be wrapped. The three way switch S9–10 (FIG. 18) when set in its "cycle" position closes contact X10 to enable the counter CTR-2. Head extended limit switch LS11 (FIG. 18) and contact X11 (line 45) alternately open and close thus making a count once each time the packaging heads are moved from their fully retracted to their fully extended positions. When the preset number of articles is counted, relay CR16 (line 45) is energized opening relay contacts CR16 (lines 43 and 50) thus de-energizing relay CR15 (line 50). With contact CR16 (line 43) open, CR20,CR19 and Y15 (lines 40–43) are de-energized when contact CR17 (line 42) is opened, which occurs at completion of the last wrap cycle, thereby stopping the motors for the brush rolls, film drive, and recorder.

The feeding of articles is controlled by energization of solenoid Y5 (lines 60–62) which controls the solenoid operated spring return valve V6 (FIG. 17B) for activating the two pairs of article feed cylinders 350,352 so that the lowermost article drops between the packaging heads but the article above it is held up by closed gates 344. When the article feed is automatically cycling, contacts CR26 (line 61) are closed. X11 and X12 are alternately closed when the packaging heads are extended and retracted in response to the heads 24,26 closing limit switches LS11 and LS12 (FIG. 18) respectively. Contact X7 is closed in response to the electric eye closing switch S7 (FIG. 18) when a fruit is present in position to be fed between the packaging heads 24,26. If the fruit is not present, contact X7 remains open preventing actuation of the cylinders 350,352. Thus, fruit feed occurs only when the packaging heads are retracted, i.e., when they are spaced from each other and when a fruit is present. Contact Y5 (line 62) is closed when solenoid Y5 is energized and remains closed until the contact X11 opens in response to the packaging heads moving to their extended positions thereby closing switch LS11 (FIG. 18) and opening contact X11. All of the articles drop one space and are supported on the lower gates 346 (FIG. 17) when solenoid Y5 is de-energized by X11 (line 60) opening.

Energization of solenoid Y5 as above described also enables a fruit drop counter CTR-4 (lines 65-66) which makes 27 counts (27/60 seconds) for the fruit to drop before energizing control relay CR12. Once the counter CTR-4 is initiated, the count is controlled by the previously described timer pulse control relay CR0 (line 100).

Energization of relay CR12 energizes solenoid Y0 (line 75) of spring return air valve V1 (FIG. 17) thus shifting the valve to its cross passage position and extending the pistons of the air cylinders 118,118a to extend the packaging heads. Contact CR12 (line 71) opens to de-energize solenoid Y1 at air valve V2, etc., to allow heads to leave retracted position. Contact Y0 (line 77)latches solenoid Y0 when contact Y1 is closed, i.e., retract head solenoid Y1 (line 70) is de-energized. Contact CR100 (line 75) is closed at this time since CR100 (line 0) is de-energized because three way switch S9-10 is on "cycle" thereby opening contact X10. It is also noted that relay contact CR26 (line 76) is closed since the machine is in "cycle". Energizing solenoid Y0 closes contact Y0 (line 170) which energizes control relay CR31 through closed contact CR30. This opens contact CR31 (line 175) which de-energizes clutch solenoid Y12. Thus, the brush rolls stop rotating and lose their ability to provide tension in the lower film portions F (FIG. 8B).

Control components of the fruit holder or article catch assembly 42 (FIGS. 2 and 17A) are illustrated in lines 80-82. The catch assembly 42 as illustrated in FIG. 2 is in the article catching position for catching the articles released from the article feeder 40 as above described. After an article (referred to as fruit) has been dropped on the fruit holder and the packaging heads start to move inwardly around the fruit, the controller 450 extend head output solenoid Y0 (FIG. 18) closes contact Y0 (line 181) which activates a fruit catch retract delay counter CTR-5 which makes 7 counts (7/60 seconds) and then energizes relay CR22. The counter CTR-5 counts pulses from the timer pulse relay contact CR0 from timer pulse relay CR0 (line 100) as previously described.

Energization of relay CR22 (lines 180-181) energizes relay CR24 (line 90) through a circuit including closed contacts CR22, CR4 and CR100. Relay contact CR24 (line 91) closes to provide a latching circuit across CR22 (line 90). Energization of relay CR24 also closes contact CR24 (line 82) which energizes retract fruit catcher or holder solenoid Y3 (line 80) thereby shifting valve V4 (FIG. 17A) which retracts cylinders 380 and thus pulls the catcher outwardly of the packaging heads 24,26 to the position illustrated in FIG. 6. The timer CTR-5 (line 180) setting is set to assure that the catcher assembly 42 is not pulled out too soon or too late.

When the extend head solenoid Y0 (line 75) was energized, it started blade extend delay counter CTR-6 (line 190-191) which delays extension of the hot blade or knife 164 (FIGS. 3B and 17A) enabling the packaging heads to clamp the film strips together and to stretch the film over the article before the hot knife 164 engages the film. Counter CTR-6 is energized by closing extend head contact Y0; the timing pulse contact CR0 makes 38 counts (38/60 seconds) before timing out and energizing relay CR32.

Energization of relay CR32 closes contact CR32 (line 95) which energizes extend blade solenoid Y2 through a circuit including closed contacts CR26, CR32, CR2, and Y1. Energization of solenoid Y2 shifts valve V3 (FIG. 17A) to its cross passage position thereby extending the blade cylinder urging the hot knife 164 into sealing and severing engagement with the film. It will be understood that the timer CTR-6 (line 191) enables the packaging heads 24 and 26, and the hot knife 164 to move toward the film at the same time.

The timer pulse relay CR0 (line 100) is illustrated between main lines L1 and L2 as being alternately energized and de-energized by its own relay contact CR0. This function is accomplished by the internal construction of the previously identified programmable controller 450 which scans the voltage peaks of the alternating current power supply. By counting alternate peaks, which for 60 HZ frequency power are 16.6 milliseconds apart, the controller thereby turns the several counters into timers.

When each of the packaging heads 24,26 and the film clamping cylinders 213,213a are fully extended thereby clamping the associated film strips from movement, each head closes a limit switch LS11 (FIG. 18), which switches are connected in series. This energizes Y4 (FIGS. 17B and 18, and line 130) to retract the pneumatic film clamp cylinders 213,213a which permits opening of the outer annular film clamps 28,30 to release tension on the area of the film being sealed and severed. Retracting these cylinders also retracts the tension releasing mechanism 304 (FIG. 8B), which provides a slack condition in lower film portion F, thus eliminating tension in that film. When both heads close their switches LS11, controller input X11 closes input contact X11 (line 45) to make the count; opens contact X11 (line 56) to de-energize relay CR18; and opens contact X11 (line 60) to de-energize fruit feed solenoid Y5. De-energization of Y5 causes spring return valve V6 (FIG. 17B) to return to its illustrated position thereby reciprocating the fruit feed cylinders 350,352 which drop the fruit column onto the lower gates 346.

Control of the seal time is initiated by seal time counter CTR-7 (lines 105 and 106). When the hot knife 164 contacts the film backed by the resilient annulus 112 as shown in FIG. 7C, limit switch LS14 and its contact X14 (FIG. 18 and line 106) are closed. This starts seal time counter CTR-7 which is sequenced by opening and closing the contact CR0 as previously described. The counter is set to provide an estimated 0.05 to 0.07 seconds of actual film contact time. The seal time can be lengthened or shortened in 0.0166 second increments to compensate for packaging head inertia and/or film sealing characteristics by resetting the counter CTR-7 thereby providing the optimum seal. When the counter counts out, control relay CR1 is energized closing cohtact CR1 (line 110) to energize relay CR2 which latches itself with the aid of closed limit switch X11. Energization of CR2 retracts the hot knife 164 by opening contact CR2 (line 95) which de-energizes solenoid Y2 allowing a spring to shift valve V3 (FIG. 17A) to its illustrated retracted position. Retraction of the knife 164 opens limit switch LS14 and contact X14 thereby de-energizing seal time counter CTR-7 (line 105).

When the hot knife is fully extended and closes switch LS14 (FIG. 18) it also energizes CR30 (line 165) which de-energizes CR31 (line 170) by opening contact CR30 thereby energizing clutch solenoid Y12 (line 175) through normally closed contact CR31 and closed contact Y9, which engages the brush roll clutch 293 to drive the film. Energization of CR30 also de-energizes Y4 (line 130) so that the clamping cylinders 213,213a return to their normal film clamping position.

Energization of relay CR2 (line 110) closes contact CR2 (line 115) which energizes air cool solenoid Y11 (FIG. 17A) which opens valve V5 and jets a ring of air at the sealing area to speed the cooling of the seal. Energization of CR2 (line 110) also starts a cool time counter CTR-8 (lines 120–121) by closing contact CR2 and the alternate closing of contact CR0 (line 120) as previously described. Counter CTR-8 times out in about one second thereby energizing relay CR3. During cool time the film strips are firmly clamped between the resilient annulus 111 (FIG. 7A) and the cooperating annulus 114 thereby isolating the molten seal from tension in the film which is stretched over the fruit.

When counter CTR-8 times out and control relay CR3 (line 120) is energized, contact CR3 (line 125) closes thereby energizing relay CR10 through closed contact CR26 and closed contact X12 of limit switch LS-12. Energization of relay CR10 also closes contact CR10 (line 127) thereby latching relay CR10 by providing a holding circuit across CR26 and CR3; and contact CR10 (lines 70–72) closes thereby energizing retract head solenoid Y1. Solenoid Y1 latches itself through a contact Y1 (line 71) that is in series with closed contact CR12. Energization of solenoid Y1 (FIG. 17) shifts the valve V2 and retracts the head cylinder 118,118a and packaging heads 24,26 (FIG. 1) connected thereto. Energization of solenoid Y1 (line 70) also opens contact Y1 (line 77) thereby de-energizing extend head solenoid Y0 simultaneously with energization of retract head solenoid Y1. Contacts Y1 (line 85) and Y1 (line 61) close, and contact Y1 (line 95) opens thereby guaranteeing that the hot knife cannot extend during retraction of the heads.

When extend head solenoid Y0 (line 75) was de-energized, it de-energized relay CR22 (line 180–181) and relay CR32 (lines 190–191) by opening contacts Y0 in these lines.

When the packaging heads 24,26 begin retracting, the limit switches LS11 associated with each head open to open contact X11 de-energizing CR2 (line 110). As the heads retract, a limit switch LS2 (FIG. 18) located at a point intermediate the travel of the associated heads is momentarily closed thereby closing contact X2 (line 85) energizing relay CR4. Energization of relay CR4 opens contact CR4 (line 90) thereby de-energizing relay CR24 which opens contact CR24 (line 82) which de-energizes solenoid Y3 which allows the valve V4 (FIG. 17A) to return to its illustrated position causing the article catchers 42 to move to their catching position illustrated in FIG. 2.

It will be understood that retraction of the two packaging heds 24,26 closes two limit switches LS-12 (FIG. 18) that are in series thereby providing power to input X12 of the controller 450. Power at X12 opens contact X12 (line 125) thereby de-energizing relay CR10.

When the two limit switches LS12 are closed, controller input X12 closes. This energizes film unclamp solenoid Y4 (line 130) thereby unclamping the outer annuluses 28,30 by retracting clamp cylinders 213,213a allowing the film to be advanced by the brush rolls 284,286 (FIG. 8B).

Closing of the two limit switches LS12 also starts the film feed time counter CTR-9 (lines 135,136) which controls the time the outer clamping annuluses 28,30 are unclamped and accordingly the film feed time.

In the event the packaging heds 24,26 take too long to extend fully, the automatic cycle of operation is stopped before the hot knife 164 reaches the plastic film. When solenoid Y0 (line 75)is energized, contact Y0 (line 196) is closed and energizes blade-head overlap interlock CTR-10 through normally closed contact X11. If the heads move so slowly as to allow CTR-10 to count out after 42 counts of CR0 (line 195), relay CR33 is energized thereby opening normally closed contact CR33 (line 5) thus opening the circuit and stopping the wrapper. If the heads 24,26 are operating at proper speed and contact each other thereby closing limit switches LS11 (FIG. 18), X11 (line 196) opens before CTR-10 counts out thereby de-energizing interlock CTR-10. Thus, relay CR33 remains de-energized and the normal automatic operation continues.

Power at input X12 (FIG. 18) also starts the fruit feed delay timer CTR-3 (lines 55,56) by closing contact X12 which is in series with closed contact X11 and which cooperates with intermittently closed contact CR0. Since the fruit drops faster than the film strips feed through the annuluses 28,30 (FIG. 6) when unclamped, the timer CTR-3 assures that the film strips will be clamped between their associated annuluses 28,30 just before the fruit hits the fruit catcher 42 (FIG. 2). When the fruit feed timer CTR-3 times out, the counter energizes relay CR18 (line 55) which closes contact CR18 (line 61). Before a fruit is dropped, four conditions must be correct: contact X7 must be closed and is closed if a fruit is present before the electric eye, S7 (FIG. 18); contact CR18 (line 61) must be closed by the timer CTR-3 being timed out as above described; R15 must be closed and is closed if the number of packaging cycles preset in the cycle counter CTR-2 (lines 45–46) has not been reached; and Y1 must be and is closed in response to the heads 24,26 being retracted. When the above four contacts are closed, fruit feed solenoid Y5 is energized shifting the valve V6 to the cross passage position closing gates 344 and opening gates 346 to drop an article (or fruit) onto the fruit catcher 42 (FIG. 2). The packaging cycles described above, and illustrated in lines 60–191 of FIGS. 19A–19D are repeated until the cycle counter CTR-2 (lines 45,46) counts out. This energizes control relay CR16 (line 45) which opens contacts on lines 43 and 50. Opening contact CR16 (line 43) de-energizes control relays CR19 and CR20 and solenoid Y15 (lines 40–42), thus opening contacts on lines 141 and 146, de-energizing film drive solenoid Y8 (line 140) and brush roll motor solenoid Y9 (line 145), respectively. De-energizing solenoid Y9 (line 145) opens contact Y9 (line 175) which de-energizes clutch solenoid Y12.

Opening contact CR16 (line 50) de-energizes control relay CR15 (line 50), which opens contact CR15 (line 61) thus preventing any further action by pneumatic components. The machine stays in this shut down condition until the three position switch S9–10 (FIG. 18) is turned from the "cycle" position, which stops power to input contact X10 (FIG. 18), opening a contact X10 (line 46) and thus de-energizing control relay CR16.

Although specific time intervals have been given for several of the counters and timers, it will be understood that different counts may be set in the counters and timers if desired.

It will be understood that controls are included in the electrical circuits to permit step-by-step operation of the machine. Thus, by closing selected manually operated switches, certain functions may be performed without being automatically followed by others of the above described function. For example, the film may be advanced by placing film drive switch S0 (FIG. 18) on "manual" thereby directing power to input contact X0 (line 140) which energizes film drive solenoid Y8 thus driving the film drive motor 240 (FIG. 1). Although the different electrical components for the manually operated circuits are illustrated in FIGS. 18 and 19A–19D in order to fully disclose the preferred embodiment of the invention, these manual circuits will not be described in detail.

FIG. 20 is a timing diagram illustrating the results of a diagnostic check on a strip chart recorder when the wrapper is adjusted to wrap grape fruit at 42 fruit per minute. The cycle starts at 0 seconds and progresses to the left until one cycle is completed at 1.43 seconds.

The vertical lines of the diagram illustrate electrical signal changes which indicate the opening or closing of switches; or the energizing or de-energizing of solenoids. The several functions performed and the associated switches (X) or solenoids (Y) are identified at the right margin for ease in cross referencing the timing diagram with the electrical circuits disclosed in FIGS. 19A–19D. The several timers and counters in the electrical circuits were set to handle packaging speeds at rates of between about 25 to 45 grapefruit per minute. It will be understood, however, that the timers and counters may be reset to handle the articles at faster or slower speeds.

From the foregoing description it is apparent that the improved method and apparatus of the present invention includes an improved low inertia film driving and controlling system which assures that the film is tensioned longitudinally and transversely to remove wrinkles from the packaging portion before they are clamped by outer clamping annuluses. The film controlling system also includes a continuously driven upper film drive mechanism and an intermittently driven lower film drive mechanism controlled by a clutch and cooperating with a film tension release mechanism to provide a relaxed annulus of film to be sealed after the outer clamping annuluses have stretched the film over the articles and then released the film, and after the stretched film has been securely clamped by inner clamp means.

The invention also includes separate annular resilient means for resisting the force of the inner sealing means on the hot knife, with the sealing plane being offset to one side of the article feed and catching mechanisms to assure that the film portion will lie in parallel planes when being sealed and severed.

Although the best mode contemplated for carrying out the present invention has been herein shown and described, it will be apparent that modification and variation may be made without departing from what is regarded to be the subject matter of the invention.

What is claimed is:

1. An apparatus for packaging articles within thermal sealing film, comprising:
means for capturing and firmly clamping first and second film portions between first and second outer pairs of film clamping annuluses,
feed means for moving an article between said captured film portions,
means for moving at least one of the first and second outer pairs of clamping annuluses toward the other for physically deforming the film portions into the general shape of the article by stretching the film portions over the article,
means defining inner clamping annuluses disposed inwardly of said outer annuluses for clamping the two film portions together at an inner film gripping plane and for providing an isolated annulus of film between said inner and outer clamping annuluses,
means for releasing said first and second outer pairs of clamping annuluses for removing tension from and relaxing said isolated annuluses of film, and
means for sealing the two portions of film together in the relaxed isolated annulus of film for sealing the first and second film portions together in an untensioned portion of the film.

2. An apparatus according to claim 1 wherein the first and second film portions are strips of film, and wherein said sealing means also severs the captured portions of the film from the strips of film in said relaxed isolated annulus of film.

3. An apparatus according to claim 1 wherein said means for clamping and thereafter releasing said first and second outer pairs of film clamping annuluses are selectively operated extensible and retractable power means bodily movable with said outer clamping annuluses, said power means being extended when stretching the captured film portions over the article for holding said film portions from slipping between said associated outer pairs of clamping annuluses, said power means being retracted prior to sealing the first and second portions of film together for releasing said outer annuluses allowing the isolated annuluses to become relaxed.

4. An apparatus according to claim 3 wherein said extensible and retractable power means includes pneumatic pistons and cylinders.

5. An apparatus according to claim 1 wherein said first and second outer film clamping annuluses defining outer film gripping planes which are both offset on one side of the inner film gripping plane of said inner clamping annuluses for assuring that both film portions in the isolated annuluses are initially pulled in the same direction over one of the inner clamping surfaces for assuring that the portions of the two films when being sealed are parallel and flat at the seal area.

6. An apparatus for packaging articles within thermal sealing film, comprising:
means for capturing and firmly clamping first and second film portions between first and second outer pairs of film clamping annuluses;
feed means for moving an article between said captured film portions;
means for moving at least one of the first and second outer pairs of clamping annuluses toward the other for stretching the film portions over the article;
means defining inner clamping annuluses disposed inwardly of said outer annuluses for clamping the two film portions together at an inner film gripping plane and for providing an isolated annulus of film between said inner and outer clamping annuluses;
means for releasing said first and second outer pairs of clamping annuluses for removing tension from and relaxing said isolated annulus of film;
means for sealing the two portions of film together in the relaxed isolated annulus of film; and
means defining an article catching assembly; said assembly comprising a pair of arms movable between an article catching position and an article releasing position, a pair of article catching wings pivoted to each arm with each pair of wings movable between a pivotally spread catching position and a parallel position, power means for moving said arms between said article catching position and said article releasing position, and control means for moving said wings when spread into article catching position to catch an article released from said feed means after said outer clamping annuluses have captured the pair of film portions and are spaced from each other, said wings and said captured film portions cooperating to retain the article in packaging position until said outer annuluses move toward each other to stretch the film portions about the article.

7. An apparatus according to claim 6 wherein said pair of wings are moved into parallel position between said outer clamping annuluses in response to said outer annuluses completing their movement toward each other.

8. An apparatus according to claim 6 and additionally comprising an article centering disc disposed immediately adjacent one of said captured film portions to aid in stabilizing the article when it is fed into said pairs of wings.

9. An apparatus according to claim 6 wherein said article catching assembly is centered in the mid plane between said outer film clamping annuluses when in their inner positions.

10. In an apparatus for packaging articles between two thermal sealing film strips comprising the combination of means defining two pairs of outer clamping annuluses for firmly clamping one portion of each film strip, first means for moving said pairs of outer annuluses between a film clamping and a film releasing position; power means for moving said two pair of annuluses between a retracted position and an extended position with the film portions clamped therein and first engaging an article for physically stretching the film portions over the article for conforming the shape of the film to that of the article, means defining a first inner clamping annulus having an inner and an outer pair of thin resilient pressure resisting annular pads secured thereto defining a planar sealing surface for engaging one of said clamped film portions, means defining a second annular clamping annulus aligned with said inner resilient pad, means for establishing relative movement between said inner clamping annuluses for moving the inner annuluses together for clamping the film strips together between said second annulus and said inner resilient pad, said two outer pairs of clamping annuluses when disposed at the ends of their film stretching stroke both being positioned on the same side of said planar surface of said first inner clamping means for assuring that annular portions of both films lie flat against each other and against said planar surface, annular sealing and severing means, and means for urging said sealing and severing means into sealing engagement with the annular portions of the film backed by said outer resilient pad after said outer clamping annuluses have released the film portions for sealing and severing the film portions in a relaxed area of the film for providing a superior seal.

11. An apparatus according to claim 10 wherein said sealing and severing means is a hot knife having an annular sealing tip with a cylindrical outer surface normal to said planar sealing surface, and having an arcuate inner sealing edge for forming a molten puddle of thermosealing material inwardly of said hot knife.

12. An apparatus for packaging an article in a stretchable container formed from two strips of thermal sealing film disposed on opposite sides of a reference plane comprising: means defining a first packaging head on one side of the reference plane having a pair of relatively movable outer clamping annuluses between which one strip of film is intermittently fed and having a single inner clamping annulus disposed on the same side of the reference plane; means defining a second packaging head on the other side of the reference plane having a pair of relatively movable outer clamping annuluses between which the other strip of film is intermittently fed and a second single inner clamping annulus disposed on said other side of the reference plane, said second packaging head including means defining an annular sealing means for sealing the two film strips about an article for forming a package, packaging head power means for moving said packaging heads toward each other for first clamping the first and second film strips between said associated pair of outer clamping annuluses and for thereafter physically stretching the captured portions of film over said article for conforming the shape of the film to that of the article, second power means for moving at least one of said single inner clamping annuluses into clamping engagement with said film strips, means for releasing said outer clamping annuluses for clamping engagement with said film for providing a relaxed area of said film strips, and means for moving said sealing means into sealing engagement with said relaxed area of said film strips to seal the strips and package the article.

13. An apparatus according to claim 12 wherein said sealing means also severs the package from said film strips.

14. A method of packaging articles within stretchable film comprising the steps of:

capturing and firmly clamping first and second film portions between first and second outer pairs of clamping annuluses, moving an article between said captured film portions, stretching the film portions over the article by moving the first and second outer pairs of annuluses and captured film portions toward each other causing the film portions to first engage opposite sides of the article for physically stretching the film portions over the article for conforming the shape of the film to that of the article, clamping the first and second film portions together with inner clamping annuluses disposed inwardly of the outer annuluses for providing an annulus of film between said inner and outer annuluses, releasing the first and second outer pairs of clamping annuluses for removing tension on the annulus of film for providing a relaxed annulus of film, and sealing the film portions together in the relaxed annulus for packaging the article.

15. A method according to claim 14 and additionally comprising the step of severing the packaged article from scrap portions of the film forming large holes therein.

16. A method according to claim 14 and additionally comprising the step of orienting the clamping surfaces of the outer pairs of clamping annuluses to one side of a sealing plane for assuring that both film portions to be sealed are contacting each other and lie flat in an annular sealing plane.

17. A method of packaging articles within stretchable film comprising the steps of:

capturing and firmly clamping first and second film portions between first and second outer pairs of clamping annuluses, moving an article between said captured film portions, stretching the film portions over the article by moving the first and second outer pairs of annuluses and captured film portions toward each other, clamping the first and second film portions together with the inner clamping annuluses disposed inwardly of the outer annuluses for providing an annulus of film between said inner and outer annuluses, releasing the first and second outer pairs of clamping annuluses for removing tension on the annulus of film for providing a relaxed annulus of film, sealing the film portions together in the relaxed annulus for packaging articles, severing the packaged article from scrap portions of the film forming large holes therein, said film portions being portions of two film strips unwound from a pair of supply rolls, continuously withdrawing the film strips longitudinally of the centerline thereof from said supply roll at a predetermined rate, terminating longitudinal movement of the film strips downstream of said captured portions while said portions are captured and are being sealed and severed to form a package and with said scrap portions of film having said large holes therein, accumulating a loop of film of each film strip upstream of said captured portions while the longitudinal movement downstream is terminated, intermittently advancing said downstream scrap portions of film by pulling said accumulated loops out until new portions of unsevered film are in position to be captured and the upstream and downstream portions are tensioned, draping the longitudinal side edges of the film portions of the edges of the outer clamping annuluses while advancing said film strips for stressing said film portions longitudinally and transversely thereby removing wrinkles from the portions of said film to be captured, and recapturing new portions of said film strips.

18. A method according to claim 17 and additionally comprising the steps of:

longitudinally severing each scrap portion along the longitudinal centerline for dividing each scrap portion into equal halves, spreading the two halves of each scrap portion of film, and separately discharging each scrap half of film by vacuum.

19. A method according to claim 17 and additionally comprising the step of providing slack in said downstream scrap portions while said captured portions are being sealed and severed for further isolating the relaxed annulus of film from tension.

* * * * *